US009897407B2

(12) United States Patent
Kramer

(10) Patent No.: US 9,897,407 B2
(45) Date of Patent: Feb. 20, 2018

(54) FIREARM-MOUNTED CAMERA DEVICE WITH NETWORKED CONTROL AND ADMINISTRATION SYSTEM AND METHOD

(71) Applicant: Centinel Solutions, Inc., New York, NY (US)

(72) Inventor: Maximilian Kramer, New York, NY (US)

(73) Assignee: CENTINEL SHIELD, LLC, Palm Beach, FL (US)

( * ) Notice: Subject to any disclaimer, the term of this patent is extended or adjusted under 35 U.S.C. 154(b) by 0 days.

(21) Appl. No.: 14/739,101

(22) Filed: Jun. 15, 2015

(65) Prior Publication Data

US 2015/0369554 A1    Dec. 24, 2015

Related U.S. Application Data

(60) Provisional application No. 62/013,596, filed on Jun. 18, 2014, provisional application No. 62/081,549, filed on Nov. 18, 2014.

(51) Int. Cl.
*F41A 17/06*    (2006.01)
*H04N 5/77*    (2006.01)
(Continued)

(52) U.S. Cl.
CPC ............... *F41A 17/063* (2013.01); *F41J 5/10* (2013.01); *H04N 5/77* (2013.01); *H04N 5/772* (2013.01);
(Continued)

(58) Field of Classification Search
CPC ........ F41A 17/06; F41A 17/066; F41A 27/28; F41G 3/165; F41G 3/2605
See application file for complete search history.

(56) References Cited

U.S. PATENT DOCUMENTS 2,282,680 A    7/1940  Sonne
6,385,589 B1   5/2002  Podvin
(Continued)

FOREIGN PATENT DOCUMENTS

AT    259052 T    2/2004
CN    1381990 A   11/2002
(Continued)

OTHER PUBLICATIONS

International Search Report in PCT/US2015/035748.
(Continued)

*Primary Examiner* — Hung Dang
*Assistant Examiner* — Sunghyoun Park
(74) *Attorney, Agent, or Firm* — Stern & Schurin LLP

(57) ABSTRACT

An electronic camera device, and associated system and interfaces, that generates, records and transmits video, audio and sensor data. Camera device comprises a housing with a fastening mechanism adapted to mount the device to a firearm. The device has a processor module, a memory module for storage, a camera module configured to generate and record video and store the video to memory. The device further includes a magnetic sensor configured to detect the presence and absence of a magnet and an accelerometer that is configured to detect a draw motion (e.g., a firearm being unholstered). When the magnetic sensor detects the absence of a magnet, and the accelerometer detects a draw motion, one or more corresponding signals are generated and transmitted, directing the camera to begin recording (and transmitting) video and send an alert signal to assets in the field to provide support.

13 Claims, 24 Drawing Sheets

(51) Int. Cl.

| | | |
|---|---|---|
| *H04N 21/2743* | (2011.01) | |
| *H04N 5/907* | (2006.01) | |
| *H04N 9/806* | (2006.01) | |
| *H04N 9/82* | (2006.01) | |
| *H04N 7/18* | (2006.01) | |
| *F41J 5/10* | (2006.01) | |
| F41C 27/00 | (2006.01) | |
| G08B 13/196 | (2006.01) | |
| H04N 9/804 | (2006.01) | |
| H04N 5/225 | (2006.01) | |

(52) U.S. Cl.
CPC ............. *H04N 5/907* (2013.01); *H04N 7/183* (2013.01); *H04N 9/806* (2013.01); *H04N 9/8205* (2013.01); *H04N 21/2743* (2013.01); F41C 27/00 (2013.01); G08B 13/19621 (2013.01); G08B 13/19673 (2013.01); H04N 5/2257 (2013.01); H04N 9/8042 (2013.01)

(56) References Cited

U.S. PATENT DOCUMENTS

| | | |
|---|---|---|
| 7,012,632 B2 | 3/2006 | Freeman et al. |
| 7,088,387 B1 | 8/2006 | Freeman et al. |
| 7,158,167 B1 | 1/2007 | Yerazunis et al. |
| 7,929,851 B2 | 4/2011 | Chen et al. |
| 8,069,605 B2 | 6/2011 | Fressola et al. |
| 8,074,555 B1 | 12/2011 | Sullivan |
| 8,319,164 B2 | 11/2012 | Martinez |
| 8,339,257 B2 | 12/2012 | Cazanas et al. |
| 8,459,996 B2 | 6/2013 | Sullivan |
| 8,573,127 B2 | 11/2013 | Sullivan |
| 8,720,092 B2 | 5/2014 | Beretta et al. |
| 8,893,420 B2 | 11/2014 | Milde |
| 8,919,024 B2 | 12/2014 | Milde |
| 8,925,463 B1 | 1/2015 | Sullivan |
| 8,931,195 B2 | 1/2015 | Milde |
| 9,140,509 B2 | 9/2015 | Sullivan |
| 9,217,616 B2 | 12/2015 | Sullivan |
| 9,217,627 B2 | 12/2015 | Sullivan |
| 9,222,740 B1 | 12/2015 | Milde |
| 9,250,035 B2 | 2/2016 | Sullivan |
| 9,303,935 B2 | 4/2016 | Milde |
| 9,310,147 B2 | 4/2016 | Milde |
| 9,316,454 B2 | 4/2016 | Milde |
| 9,377,259 B2 | 6/2016 | Milde |
| 9,395,133 B2 | 7/2016 | Milde |
| 9,410,782 B2 | 8/2016 | Bruno |
| 9,551,543 B2 | 1/2017 | Milde |
| 9,574,837 B2 | 2/2017 | Sullivan |
| 9,618,287 B2 | 4/2017 | Milde |
| 9,644,912 B2 | 5/2017 | Milde |
| 9,726,448 B1 | 8/2017 | Milde |
| 9,739,555 B2 | 8/2017 | Milde |
| 2002/0005895 A1 | 1/2002 | Freeman et al. |
| 2002/0154889 A1 | 10/2002 | Jeon et al. |
| 2005/0200746 A1* | 9/2005 | Ahn ............... G03B 17/02 348/373 |
| 2006/0055820 A1* | 3/2006 | Lyon ............... G08B 13/19619 348/373 |
| 2007/0028501 A1 | 8/2007 | Fressola et al. |
| 2008/0039962 A1* | 2/2008 | McRae ............... F41A 17/06 700/90 |
| 2008/0112698 A1* | 5/2008 | Ray ............... G03B 29/00 396/56 |
| 2008/0170130 A1* | 7/2008 | Ollila ............... H04N 5/2252 348/211.99 |
| 2010/0239238 A1 | 9/2010 | Chen et al. |
| 2010/0284683 A1 | 11/2010 | Fressola et al. |
| 2011/0025491 A1* | 2/2011 | Cazanas ............... F41A 19/01 340/539.1 |
| 2011/0157388 A1 | 6/2011 | Liu |
| 2011/0252684 A1* | 10/2011 | Ufer ............... F41A 19/01 42/1.03 |
| 2014/0157349 A1* | 6/2014 | Robinson ............ G06K 9/00228 726/1 |
| 2014/0215885 A1 | 8/2014 | Sullivan |
| 2014/0290109 A1 | 10/2014 | Stewart et al. |
| 2014/0290110 A1 | 10/2014 | Stewart et al. |
| 2014/0378088 A1* | 12/2014 | Goel ............... F41A 17/063 455/404.2 |
| 2015/0113851 A1 | 4/2015 | Bensayan |
| 2016/0161217 A1 | 6/2016 | Sullivan |
| 2016/0252335 A1 | 9/2016 | Sullivan |
| 2016/0258726 A1 | 9/2016 | Sullivan |
| 2016/0258727 A1 | 9/2016 | Bruno |
| 2016/0273859 A1 | 9/2016 | Milde |
| 2017/0097216 A1 | 4/2017 | Sullivan |
| 2017/0102218 A1 | 4/2017 | Sullivan |
| 2017/0138710 A1 | 5/2017 | Sullivan |
| 2017/0160056 A1 | 6/2017 | Sullivan |
| 2017/0176123 A1 | 6/2017 | Milde |

FOREIGN PATENT DOCUMENTS

| | | |
|---|---|---|
| CN | 1190960 C | 2/2005 |
| CN | 101840045 A | 9/2010 |
| DE | 69914550 T2 | 12/2004 |
| EP | 0985899 A1 | 3/2000 |
| EP | 1251702 A2 | 10/2002 |
| EP | 0985899 B1 | 2/2004 |
| EP | 1251702 A3 | 3/2005 |
| JP | 2000-092428 A | 3/2000 |
| JP | 2003-046945 A | 2/2003 |
| JP | 3950003 B2 | 7/2007 |
| JP | 2009-162413 A | 7/2009 |
| JP | 4996453 B2 | 8/2012 |
| KR | 10-2002-0081761 A | 10/2002 |
| KR | 10-0750096 B1 | 8/2007 |
| WO | 2014163653 A1 | 10/2014 |

OTHER PUBLICATIONS

Written Opinion of the International Searching Authority in PCT/US2015/035748.
Daley, Haven; Associated Press; Oct. 24, 2014; "California startup unveils gun technology for cops".
Stuart, Hunter; Hunter@Huffingtonpost.com; Oct. 24, 2014; "Company Makes Gun Tech That Could Help Prevent Police Brutality".
Associated Press; May 21, 2013; "High-Tech Guns Would Allow Users to Disable Weapons Remotely".
Men, Calvin; Santa Cruz Sentinel; Oct. 24, 2014; "Capitola company, Sheriff's Office partner up to test firearm tracking technology".
Taser's Axon Body on Officer Device; May 2, 2014.
U.S. Appl. No. 61/825,985, filed May 21, 2013, With Priority Thereto Claimed in US20140290109 and 20140290110.
U.S. Appl. No. 61/853,179, filed Apr. 1, 2013, With Priority Thereto Claimed in US20140290109 and 20140290110.
U.S. Appl. No. 61/853,971, filed Apr. 16, 2013, With Priority Thereto Claimed in US20140290109 and 20140290110.

* cited by examiner

FIG. 16

FIREARM-MOUNTED CAMERA DEVICE WITH NETWORKED CONTROL AND ADMINISTRATION SYSTEM AND METHOD

RELATED APPLICATIONS

This application claims priority to U.S. provisional Application Ser. No. 62/013,596, filed on Jun. 18, 2014, and U.S. provisional Application Ser. No. 62/081,549, filed on Nov. 18, 2014, which are each incorporated herein by reference.

FIELD OF THE INVENTION

This invention relates to a firearm-mounted electronic device and networked system for detailing the position and movement of a firearm and other data associated therewith. More particularly, the invention involves a firearm-mounted camera device that transmits data relating to the firearm and use thereof, including video, audio, sensor data and other information, and which is operatively connected to an administration facility which controls and manages the camera device and cases, firearms, users and events associated with the camera device via graphical user interfaces generated by the system.

BACKGROUND OF THE INVENTION

Many acts of a lethal or non-lethal nature that are taken by police officials in the name of law enforcement are often questioned by the media, the public and public authorities seeking to determine whether those acts were justified or committed with wrongful intent. For example, after a police officer fires upon and kills a suspect, the officer must explain the circumstances of his actions. Sometimes, authorities investigating the actions and motives of the police officer have reservations about the course of events as averred by the officer even when the officer's acts were justified. Conversely, there are instances where a police officer's actions and motives are inappropriate, yet the self-serving statements made by a police officer about the course of events that transpired leading up to the fatal shooting are not questioned and taken for granted. Thus, there is considerable need to have objective evidence of events that occur in the moments surrounding a shooting involving a police officer.

Moreover, while some patrol vehicles carry video cameras and recording equipment to monitor and chronicle events, such as at routine traffic stops, the observation equipment fitted on these vehicles typically focuses on what transpires directly in front of the vehicle, lacking the dynamic movement and viewpoint of the law enforcement official interacting with the passengers in a vehicle or with a suspect facing the police officer. In addition, not all police officers patrol by car and many, especially in large metropolitan areas, are required to patrol on foot. Even for those officers who patrol with the assistance of a vehicle, an appreciable number of officers must nevertheless leave the immediate vicinity of their vehicles to pursue suspects on foot without video recording equipment to monitor their actions and interactions with suspects. In view of the foregoing, there is a need to have a compact video recording system for each officer on patrol which records footage during specified instances of activity—such as after a firearm is drawn or a physical altercation ensues—which records events from the viewpoint of the officer and/or the officer's firearm.

In view of the foregoing, there is a continued need to be able to capture events leading up to a shooting immediately after a firearm is unholstered to aid authorities and fact-finders who must make determinations about whether an officer's acts were appropriate or inappropriate, and if improper, to what extent. Having such a tool can also serve to save taxpayers millions of dollars by avoiding criminal investigations and public trials.

Moreover, capturing video prior to drawing a weapon, such as in the midst of a physical engagement while a weapon is still holstered, would also be extremely helpful to authorities and fact-finders who must make determinations about whether the acts of the shooter were justified. Capturing video may also assist authorities and fact-finders to determine the mental state of an officer, which is a particularly important in, for example, determining penalties and criminal charges, where punishment is based in large part on an actor's intent.

DESCRIPTION OF THE INVENTION

In view of the drawbacks and shortcomings of the prior art, it is a primary object of the present invention to provide a firearm-mounted electronic device and networked system and method that validate actions of law enforcement officials.

Another object of the present invention is to provide a firearm-mounted electronic device and networked system and method of identifying, isolating and gathering forensic evidence, such as video data, audio data, sensor data and other data, in connection with the use of a firearm by law enforcement officials.

It is a further object of the present invention to provide a firearm-mounted electronic device and networked system and method that chronicles events after the unholstering of a firearm and leading up to a hostile incident (e.g., shooting) to assist authorities and fact-finders in making determinations about whether actions taken by an individual carrying a firearm are justified or wrongful.

It is another object of the present invention to provide a firearm-mounted electronic device and networked system and method that chronicles events leading up to a hostile incident from the viewpoint of a firearm.

It is yet another object of the present invention to provide a firearm-mounted electronic device that is compact and mobile and configured to chronicling events surrounding a hostile incident.

A further object of the present invention is to provide a firearm-mounted electronic device and networked system and method that chronicles events surrounding a hostile incident that helps save taxpayer resources.

An additional object of the present invention is to provide a case management function to which an event, firearm user, camera device and firearm are assigned for subsequent review.

In view of the drawbacks and deficiencies of the prior art, there is provided, in a preferred embodiment of the present invention, a camera device that is adapted to be mounted to a firearm and operatively connected to an administration facility which controls and manages the camera device and firearms, users, events and cases associated with the camera device via a graphical user interface.

In a preferred embodiment of the present invention, the electronic camera device comprises a camera and microphone for monitoring events in video and audio, and a CPU or processing unit for processing instructions and controlling the camera device and its functions. The device further includes a non-transitory storage medium (e.g., NAND flash memory, memory card), a power management unit and power supply, and a plurality of status indicators and switches. The camera device is operatively connected to an administration facility or other hosted web-based service via the Internet, cellular network, other mobile data network, radio network or other available network using one or multiple methods of communication that are known in the art such as WiFi, mobile data, cellular, radio and Bluetooth®, and preferably utilizing encryption tools to prevent unauthorized access and to maintain the integrity of the data and controls being communicated to and received from camera device and administration users and facilities. Administration facility controls and manages the camera device and data relating thereto via a graphical user interface, as well as the firearms, users, events and cases associated with the camera device.

The electronic camera device generates and records video data, audio data, sensor data and other data. The device comprises a housing with a fastening mechanism that is adapted to mount the device to a firearm. The device has a number of internal components including a processor module for processing instructions and controlling functions of the device, a memory module for storage, a camera module configured to generate and record video and store the video to memory. The device further includes a magnetic sensor configured to detect the presence and absence of a magnet and an accelerometer that is configured to detect a draw motion (e.g., a firearm being unholstered). When the magnetic sensor detects the absence of a magnet, and the accelerometer detects a draw motion, one or more corresponding signals are generated and transmitted, directing the camera to begin recording (and transmitting) video.

The camera device and associated system of the present invention is designed and intended to perform the following tasks:

1. Capture, record, stream and store video data, audio data, sensor data and other data (optionally and preferably in real time), that are associated with an event involving the unholstering of a firearm and use of a firearm-mounted camera device for subsequent access, review and use;

2. Creation and management of cases to which video data, audio data, sensor data and other data is associated for evidentiary purposes or other purposes for subsequent access, review and use;

3. Creation and management of cases, events, camera devices, firearms and users which are associated to one another for evidentiary and/or other purposes to ascertain and confirm the circumstances of a particular case associated with a particular set comprising one or more of each of an event, a camera device, a firearm and a user;

4. Gather available sensor data to enhance review and management of cases and events pertaining to the use of a firearm; and 5. Provide interfaces for administrative and other users to create and conduct searches in a table populated with data pertaining to events that are defined in part by the unholstering of a firearm, and displaying results of searches, each of the events being associated with identifiers including a Date of Event, an Event ID (and/or a Video ID), a Camera ID, a Firearm ID and a User ID.

BRIEF DESCRIPTION OF THE DRAWINGS

The above-described and other advantages and features of the present disclosure will be appreciated and understood by those skilled in the art from the following detailed description and drawings of which:

FIG. 16 illustrates an exemplary graphical user interface or display of a user management function and information display in accordance with an exemplary embodiment of the claimed invention;

DETAILED DESCRIPTION OF THE INVENTION

Figure 1:
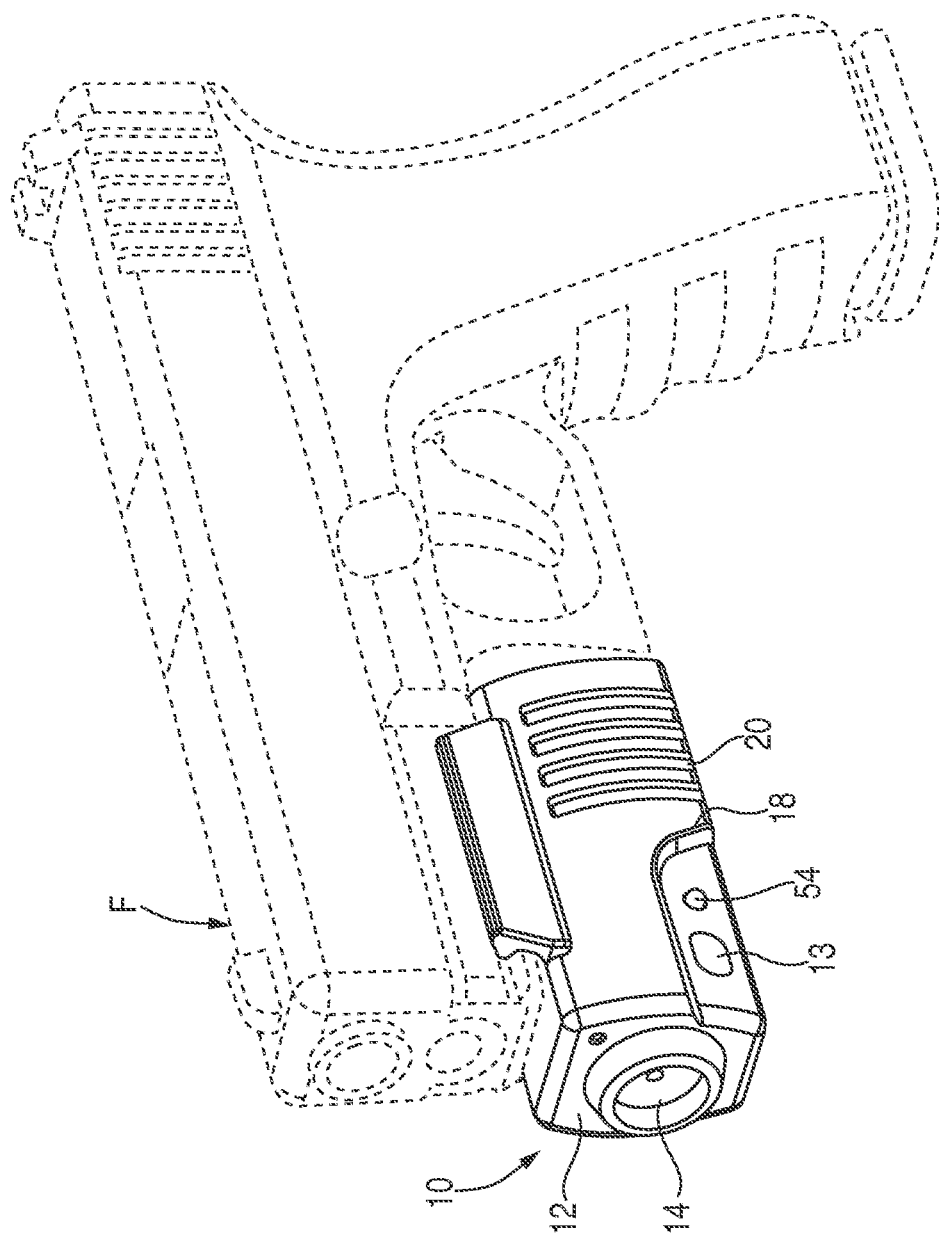
FIG. 1 is a perspective view of an exemplary embodiment of a firearm-mounted electronic device of the present invention, with a sample firearm presented in broken lines for environmental purposes.

With reference to FIG. 1 and FIG. 21 through FIG. 31, there is shown a preferred embodiment of a firearm mounted camera device 10 of the present invention. Although referred to herein in many instances as a "camera device" it should be appreciated that device 10 comprises a number of components in addition to a camera. The hardware components are preferably integrated into a single combined unit, although it should be understood that some hardware components, such as those relating to communications may be located at a separate location, as at the holster of a user or vehicle of a user, or other location in the general vicinity.

Camera device 10 comprises a camera housing 12, camera lens 14, internal functional components (detailed below) and means for securing camera device 10 to a firearm F. In an exemplary embodiment, camera device 10 is secured to a firearm F via a Picatinny-type rail mount system provided on the underside of the barrel of a firearm or service pistol that works in conjunction with a selectively releasable clamp 16 and associated toggle 17 located on the top side of the camera device 10. In alternate exemplary embodiments, a camera device is adapted to mount to other sections of a pistol or small firearm, such as a magazine baseplate extension, across the top of the barrel and/or on the side of a weapon barrel. Moreover, it should be appreciated that in further alternate exemplary embodiments a camera device is adapted to attach to other semi-automatic and/or automatic firearms such as rifles and shotguns.

Figure 25:
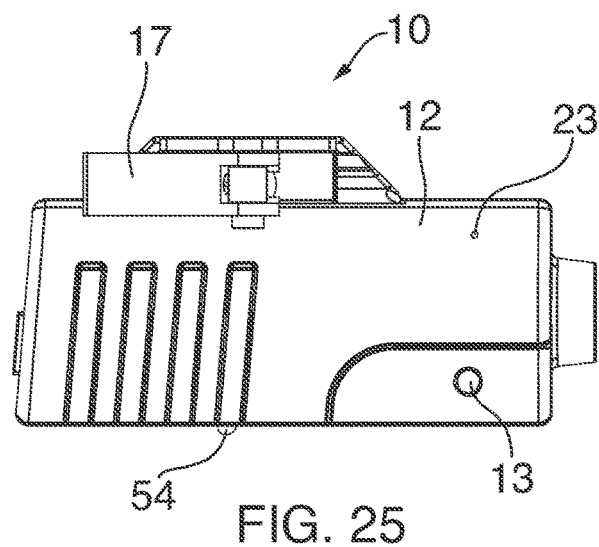
FIG. 25 illustrates a right side view of an electronic camera device in accordance with an exemplary embodiment of the claimed invention.
Figure 26:
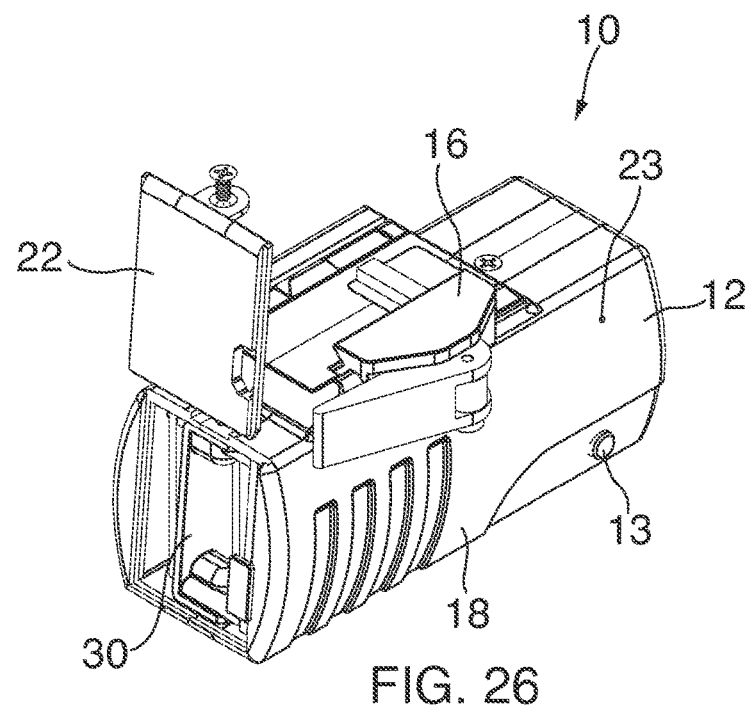
FIG. 26 illustrates a rear, right and top perspective view of an electronic camera device in accordance with an exemplary embodiment of the claimed invention, with a rear panel removed.
Figure 27:
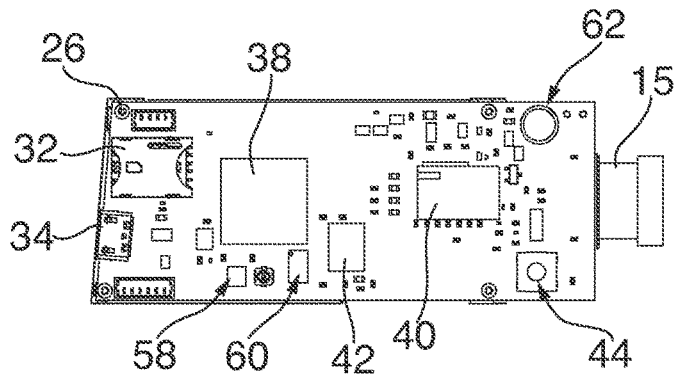
FIG. 27 illustrates a right side view of an electronic camera device without a housing in accordance with an exemplary embodiment of the claimed invention.
Figure 29:
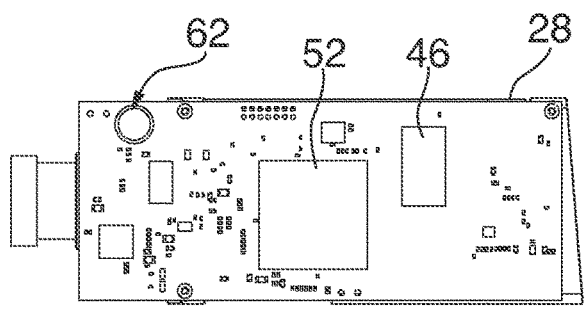
FIG. 29 illustrates a left side view of an electronic camera device without a housing in accordance with an exemplary embodiment of the claimed invention.
Figure 28:
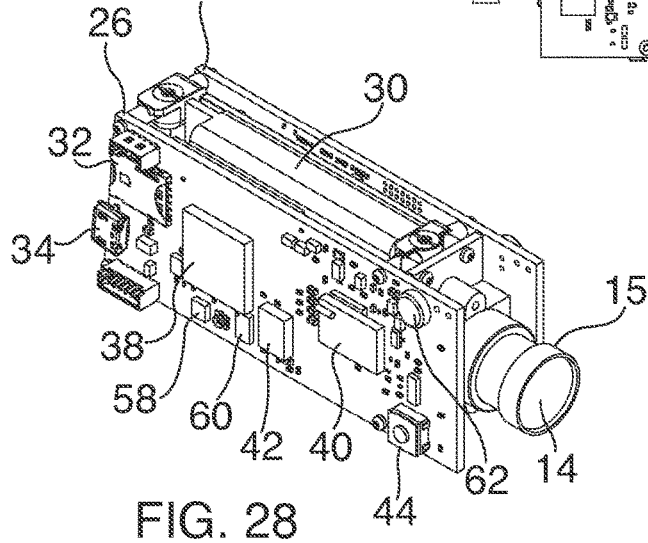
FIG. 28 illustrates a right, front and top perspective view of an electronic camera device without a housing in accordance with an exemplary embodiment of the claimed invention.
Figure 30:
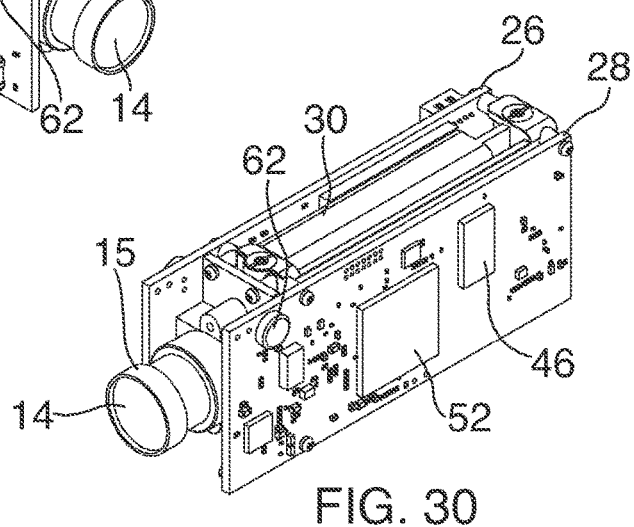
FIG. 30 illustrates a left, front and top perspective view of an electronic camera device without a housing in accordance with an exemplary embodiment of the claimed invention.
Figure 31:
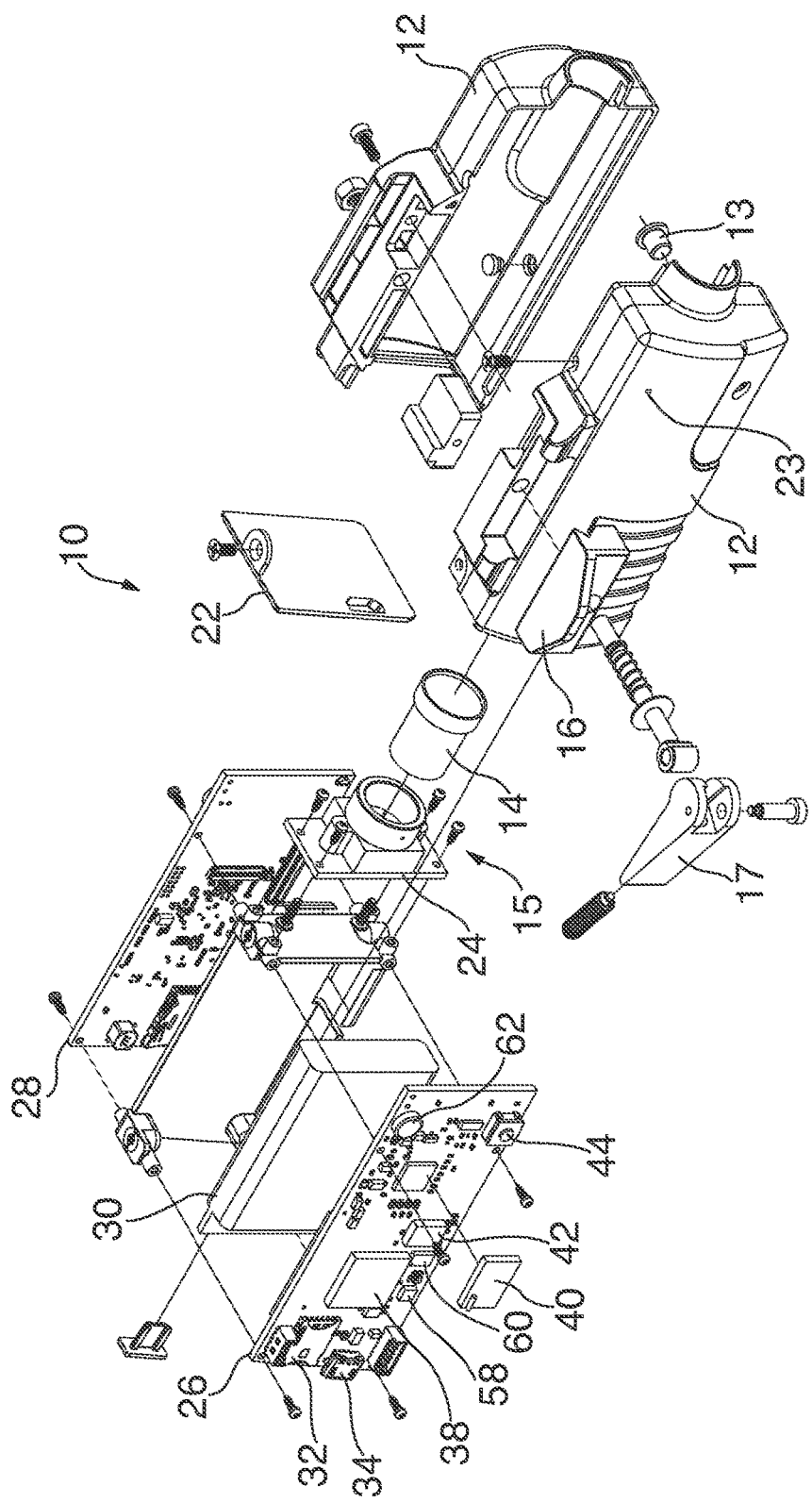
FIG. 31 illustrates and exploded view of an exemplary embodiment of an electronic camera device of the present invention.

An exemplary embodiment of the housing 12 of camera device 10 is illustrated in FIG. 21 through FIG. 26 and FIG. 31. Housing 12 has a maximum width dimension of about 36.4 mm across lens 14, and a width dimension of approximately 27.4 mm at the base. With reference to FIG. 25, housing 12 has a maximum length dimension of approximately 92.1 mm, including lens 14. Housing has a maximum height of 36.0 mm without releasable clamp 16 and approximately 45.8 mm with the releasable clamp. Although detailed dimensions of camera device 10 are specified herein, it should be appreciated that one or more of the dimensions may be modified to accommodate larger or smaller firearms and different forms of mounting systems. Either side of housing 12 comprises a curved wall 18 with four grooves 20. A QR code or other form of identifier such as a barcode or alphanumeric identifier can serve as a Camera ID which is optionally placed on the wall 18 or the underside of the device 10, as desired. As shown in FIG. 26, the rear side of housing 12 comprises a removable panel 22 enabling access to internal components of camera device 10.

With reference to FIG. 27 through FIG. 31, there is presented the internal hardware components of an exemplary embodiment of camera device 10. Disposed at the front end of camera device 10 is a camera 15 including its lens 14 and camera board 24 including a camera image sensor, such as a 1080p/720p HD color CMOS image sensor by OmniVision, model OV2715. Between boards 26, 28, there is a power supply 30, such as LI-PO or lithium polymer battery pack. Power board 26 accommodates a SIM card 32 and a USB connector 34 at the rear end thereof. Power board 26 further accommodates a power management unit 36 with an integrated battery charger, which supplies power to the device components. In an exemplary embodiment, Austria Micro Systems AS3711 high current power management unit for portable devices is utilized. A Wi-Fi and Bluetooth module 38, such as a WL1835, is present on board 26 providing Wi-Fi and Bluetooth communications capability for device 10. On the opposite side of power board 26, a cell modem 40 with integrated GPS, is positioned to provide further wireless communications capability and position location for device 10. A microcontroller 42, such as a Microchip PIC16LF1827, is also present on power board 26. A manual switch 44 is incorporated to manually turn camera device 10 on and off, as desired. Switch 44 may be actuated by pressing an actuator or conventional button 13 on the exterior of the housing 12. Also present on board 26, is microphones 62 to detect audio through microphone aperture 23 on housing 12. Board 28 comprises different forms of memory including a DDR memory module 46, an SD card module (not shown) and a NAND flash memory module (not shown). Board 28 further comprises a CPU or processor 52, such as DM385 or DM368 digital media processor.

All of the foregoing components are operatively connected to one another to create an exemplary embodiment of camera device 10. Although detailed specifications of some of the specific models of components are provided for device 10, it should be understood that different and updated components may be utilized as well with alternatives and advancements in technology, particularly with regard to communications, power consumption, memory and processor capabilities.

Figure 2:
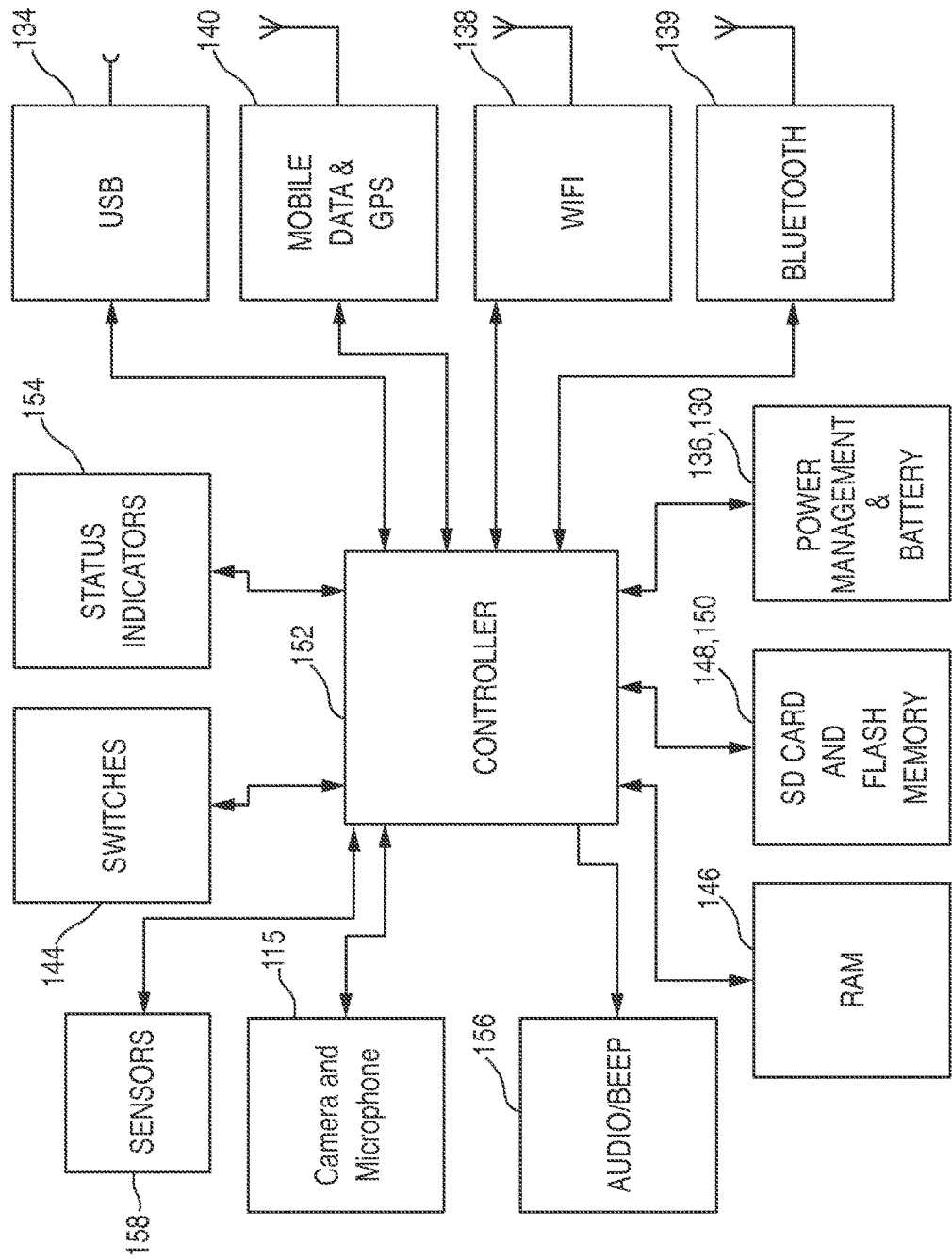
FIG. 2 is a schematic illustration of an exemplary embodiment of the hardware of a firearm-mounted electronic device of the present invention, with processor/CPU controller operatively connected to variety of components that contribute to the functionality of the firearm-mounted electronic device and system.

Referring to FIG. 2, there is shown a schematic illustration of an exemplary embodiment of the hardware modules of firearm-mounted electronic camera device 10 of the present invention. Generally, each of the modules or components referenced hereinabove in FIG. 21 through FIG. 31, as well as some additional modules or components, are represented in the elements illustrated in FIG. 2, and contribute to the functionality of camera device 10. It should be understood that a group of two or more hardware components may be collectively represented under a single representative module in FIG. 2. By the same token, it should be appreciated that some representative modules or components may be represented in the schematic of FIG. 2, and incorporated into a different embodiment of a camera device which is not specifically detailed in this specification. Each of these modules or components are preferably physically located at the firearm-mounted camera device 10 with interoperability and interconnectivity to other parts of the system through various modes of communication and transmission.

With further reference to FIG. 2, processor unit or CPU controller 152 is operatively connected to variety of components that contribute to the functionality of the firearm-mounted electronic camera device 10 and system. Camera device 10 is controlled by controller 152, comprising one or more integrated circuits, processors or CPUs used to process data and instructions, compress data, encrypt data, store data and transmit recorded data. Controller 152 controls the main functions that support the intended functionality of the device 10 and system where the weapon-mounted features are in use to capture video, audio and other available data from sensors. In that regard, controller 152 is operatively connected to camera 115 to capture video that is processed, compressed, encrypted, stored and transmitted based on instructions acted upon by the controller 152. Preferably device 10 also incorporates a microphone for receiving audio data as well which is schematically represented with camera 115.

Status indicators 154, such as an LED indicator 54, and an audio or beeping transmitter 156 for providing feedback to a user about status and current ongoing functions taking place at camera device 10 are also provided and operatively connected to controller 152. Status indicators 154 (preferably visually-based) and audio notification component 156 provide users with information, for example, on the mode or state that the system is in, battery levels, status of recording data, status of transmitting data, available space, streaming information status and other forms of feedback relating to the functions performed by the system of which a user may find helpful and necessary, particularly in the field.

Controller 152 is operatively connected to a hard disk and/or memory running software comprising machine-readable instructions that control the functions of the system. Storage for general use by controller 152 may come in the form of RAM 146 which is preferably not routinely removable from device 10. Generally, RAM 146 is non-volatile memory and used by the CPU 152 for calculations and buffering of video, when needed. SD card 148 is a form of memory provided primarily for purposes of storage of recorded video. NAND flash memory 150 functions similar to a hard drive on a PC, and is used to store programs and settings. Depending on the availability of space, storage and memory, flash memory 150 and/or SD card 148 are used to store video, audio and sensor data that is captured each time device 10 is in use. Controller 152 is powered by power supply or battery 130 which is capable of being recharged as needed. It is preferable for the power supply 130 to be charged independent of a holster.

Communications for transmitting and receiving data are enabled in the form of a Wi-Fi module 138, a Bluetooth module 139, and/or mobile data, cellular and GPS communication module(s) 140 which are used to communicate and interact with other components of the system. Thus for example, Bluetooth module 139 is adapted for purposes of interacting and communicating with other local cameras and sensors that are physically separated from the controller 152. Wi-Fi module 138 and mobile data module 140 are, in most instances, used to connect and communicate with the back-end of the system, as at administration facility to where data is transmitted and then stored. A local viewer or user on a handheld device may also be operatively connected by using any of foregoing, preferably Wi-Fi or Bluetooth. It should be appreciated that other forms of communications known the art may be integrated with or used instead of those specifically mentioned above. Control, transmission or receiving of data is also available via USB 134, which enables software updates, local control, and access of video data when authorized. Notably, GPS module is utilized for identifying a general location and specific coordinates in latitude and longitude which may be inserted into video that is recorded and/or transmitted from camera device 10. Location information may also be provided to other assets in the field which are notified and instructed to assist once a firearm is unholstered.

Switches 144, which sometimes operate in a coordinated manner with selected sensors 158 as detailed below, are provided to enable users to control functions of the system. User switches and associated controls are provided to enable users to control video start and stop functions, turn device 10 on and off, and send or stop sending data and controls, and receive or stop receiving data and controls.

Sensors 158 are, in an exemplary embodiment of camera device 10, utilized to sense, detect and/or recognize, for example, differences in the environment, movement of a camera device 10, contact with a camera device 10, force applied to camera device 10, events being "viewed" by a camera device 10, sound being "heard" by camera device 10, and the presence (or absence) of a magnet at a predetermined proximate distance of or in contact with camera device 10. Sensor data and signals that are generated and transmitted based on stimuli detected or recognized by sensors 158 are used to control a number of functions of camera device 10 and the system, switch between a resting state and an active state, and to turn device 10 on and off or between on and a sleep mode. Likewise, sensor data are used to control, commence and cease certain functions, including (1) video record and transmit functions; (2) audio record and transmit functions; (3) other sensor data record and transmit functions. It should be appreciated that many sensors 158 are utilized in connection with camera device 10, and various configurations of sensors are available.

In a first example of representative sensors 158 integrated into and utilized by camera device 10, a magnetic sensor 58, which detects the proximate presence of a magnet, is provided, for example, on one or both boards 26, 28. Magnetic sensor 58 is in operative communication with an auxiliary processor, such as microcontroller 42, which constantly monitors the magnetic sensor when the device is in a sleep state. When magnetic sensor 58 detects a magnet, signals are generated and transmitted to an auxiliary processor (and/or directly or indirectly to the main processor 52) signaling that camera device 10 is in a resting state in a holster that is fitted with a magnet positioned proximate to the magnet sensor when camera device is placed in the holster. When magnetic sensor 58 detects or recognizes the absence of the magnet, which occurs because firearm-mounted camera device 10 is removed from a holster (which contains a magnet), a signal are generated and transmitted to an auxiliary processor (and/or directly or indirectly to the main processor 52) signaling that camera device 10 should transition to an active state and begin capturing and recording video and audio. Other functions of camera device 10 also may commence, including communication functions such as the transmission and streaming of data (e.g., video data, audio data, location/GPS data, and other sensor data) via available communication modules (e.g., WiFi 138, Bluetooth 139, cellular 140). Upon re-holstering of a firearm with a firearm-mounted camera device 10, magnetic sensor 58 senses the magnet present in a holster and generates a signal allowing camera device 10 to re-enter a resting state or off state. In the event video and audio (and other sensor data) that was captured and recorded has not been fully transmitted to administration facility 70, camera device 10 may continue to transmit same until completion.

In a further exemplary embodiment of the present invention, when magnetic sensor 58 detects or recognizes the absence of a magnet, which occurs because firearm-mounted camera device 10 is removed from a holster which contains a magnet, signals are generated and transmitted to an auxiliary processor (or main processor) signaling that camera device 10 should transmit or send a critical help or emergency alert support signal or notification, advising other pertinent "assets" in the field or at remote locations that a firearm-mounted camera device 10 has been drawn. In this instance, "assets" include officers in the general vicinity or within a predetermined distance of unholstered camera device 10, squad cars or other vehicles in the general vicinity or within a predetermined distance of unholstered camera device 10 and other cameras in the general vicinity or within a predetermined distance of unholstered camera device 10. In an exemplary embodiment, after a critical help or emergency alert signal is generated, camera device 10 communicates with backend or administration facility 70 and/or administration interface 78 where administration user AU monitors critical help or emergency alert signals. Thereafter, the system programmatically or via administration user AU (or other dispatch users) transmit emergency alert support signals or notifications to other assets in the area notifying and/or instructing them to provide direct support or backup support to the user of the unholstered camera device 10. Emergency alert support notifications and instructions can be sent to assets by transmitting signals to other camera devices 10 (e.g., to emit an audio notification or beeping sound via module 156) alerting the users of those devices to provide support. Alternatively, support notifications and instructions can be sent to other assets via conventional communications (e.g., radio, computer, walkie-talkie). Likewise, other cameras C in the general vicinity of or within a predetermined distance of unholstered camera device 10 may be remotely directed to begin capturing and recording video and to send that video to administration facility 70 and administration interface 78 where administration user AU is monitoring events.

A second example of representative sensors 158 integrated into and utilized by camera device 10 is an accelerometer 60 which detects and recognizes movement and force applied to camera device 10. Accelerometer 60 is in operative communication with an auxiliary processor, such as microcontroller 42 and is adapted to measure movement using x, y, z axis coordinates. Accordingly, accelerometer 60 recognizes and detects when a firearm-mounted camera device 10 is holstered or unholstered and then generates and transmits a signal to microcontroller 42, controller 52 or other components in response to the holstering or unholstering of the firearm-mounted camera device 10. For example, when accelerometer 60 detects that a firearm-mounted camera device 10 has been unholstered, a signal is generated to begin video and audio capture, as well as recording and/or transmission thereof. Upon re-holstering of a firearm F with a firearm-mounted camera device 10, accelerometer 60 is able to recognize and determine, based on a user's movements, that the camera device 10 is present in a holster and generates a signal allowing camera device 10 to re-enter a resting state. In the event video and audio (and other sensor data) that was captured and recorded has not been fully transmitted to administration facility 70, camera device 10 may continue to transmit same until completion.

In a preferred embodiment, since users each have a unique firearm draw, an accelerometer 60 is programmed or trained to recognize or detect the movements of a user, and specifically the 'draw motion' of a user, by utilizing x, y, z coordinates associated with the firearm draw of a particular user over the duration of the draw. In addition to the actual motion, accelerometer may also be utilized to detect specific speeds of motion which in turn can be integrated to better detect and recognize the draw of a particular user. Thus, when movements are detected that simulate or are akin to the drawing of a firearm by a particular user, a signal is generated to begin video and audio capture, as well as recording and/or transmission thereof.

It should be appreciated that since either magnetic sensor 58 or accelerometer 60 can be utilized to detect that a firearm-mounted camera device 10 has been unholstered, the features and benefits associated with the integration and use of a magnetic sensor 58 are also applicable when camera device utilizes an accelerometer 60. Therefore, in addition to generating and transmitting a control signal that begins the capture, recording and transmission of video and audio, an accelerometer 60 can also be utilized to trigger the generation and transmission of a critical help or emergency alert signal to advise other pertinent assets in the field or at remote locations that a firearm-mounted camera device 10 has been drawn. As with the use of a magnetic sensor 58, a message or summons is then transmitted to other camera devices 10 or sent via conventional communication means by a dispatcher, to other nearby law enforcement units to inform them that a firearm has been drawn and that a conflict has ensued.

In an exemplary embodiment, both an accelerometer 60 and magnetic sensor 58 are integrated into camera device and work in tandem to recognize and detect when a firearm-mounted camera device 10 is unholstered (and holstered). Where both types of sensors 58, 60 are utilized, a control signal to commence video and audio capture, recording and/or transmission is not generated unless both sensors 58, 60 detect and recognize that the firearm-mounted camera device 10 is not merely unholstered, but unholstered in a manner which suggests that firearm F was drawn in response to a threat or emergency. Thus, for example, when an officer casually removes his/her firearm from his/her holster, magnetic sensor 58 will detect that the firearm-mounted camera device 10 has been removed. However, since the accelerometer 60, by virtue of its programming or training, will not recognize that the firearm has been drawn or unholstered in response to a threat or emergency, no control signal will be automatically generated to commence video and audio capture (nor to send an emergency alert signal). In this exemplary embodiment, accelerometer acts as a failsafe to ensure that operations are not switched 'on' accidentally or unintentionally even if the camera device 10 is separated from the holster.

In a preferred embodiment, location data provided by GPS or Wi-Fi may be utilized to create a "geofence" around certain specified and predetermined or preprogrammed locations that keeps camera device 10 in an off state or in a rested state and prevents camera device 10 from automatically turning on to commence recording and streaming of video, audio and sensor data. Generally, this feature is enabled in locations where the unholstering of a firearm is not abnormal and is often expected, such as at police stations, training facilities, courthouses, jails and other facilities. Preferably, utilization of this feature does not preclude the use of manual switches to turn camera device 10 on and off.

Notably, accelerometer 60 is also utilized to generate a signal that activates video and audio capture, recording and transmission functions in instances where accelerometer 60 detects a sufficient and predetermined level of stress, force or impulsive movements applied to camera device 10, such as would be indicative of a struggle. In that regard, accelerometer 60 is also able to detect and recognize bizarre movements and send signals to record and transmit associated video, audio and sensor data. Whether movements detected by accelerometer 60 are indicative of a struggle is determined by comparing movements to a baseline draw motion, or to other movements and impulses which are known to be within a predetermined normal range for a particular user (or group of users). If these movements are outside the range of normal motion, then accelerometer 60 triggers operation to commence.

Accelerometer 60 can also be utilized to detect and recognize forensic data relating to the use of a firearm, including, shots fired, shot succession, angles of firearm use and timing. These data are recorded as desired and transmitted to admin facility 70 and available at interface 78 for evaluation and reporting.

It should be appreciated that regardless of the type of sensor used to trigger the activation of camera device 10 to commence the capture, recording and transmission of video, audio and other sensor data, a manual switch 44 and actuator 13 are provided to activate camera device 10 to ensure that the device operates upon demand (subject to power supply and/or storage limitations).

A third example of representative sensors 158 integrated into and utilized by camera device 10 is camera image sensors which detect and capture video and are able to detect differences in ambient light levels. In response to ambient light changes in particular, sensors generate signals which are transmitted to other components of camera device 10 to compensate and adjust to the changes in ambient light. This enables camera device 10 to capture video that is as clear and sharp as possible.

A fourth example of representative sensors 158 integrated into and utilized by camera device 10 is a microphone 62 or sound sensors which detect and capture sound that is generated in the environment of camera device 10 to supplement video being captured. Also, in instances where video is unavailable because lens 14 is blocked or a firearm is in a holster, such as during a struggle, sound may still be detected and captured by a microphone or sound sensor.

Figure 3:
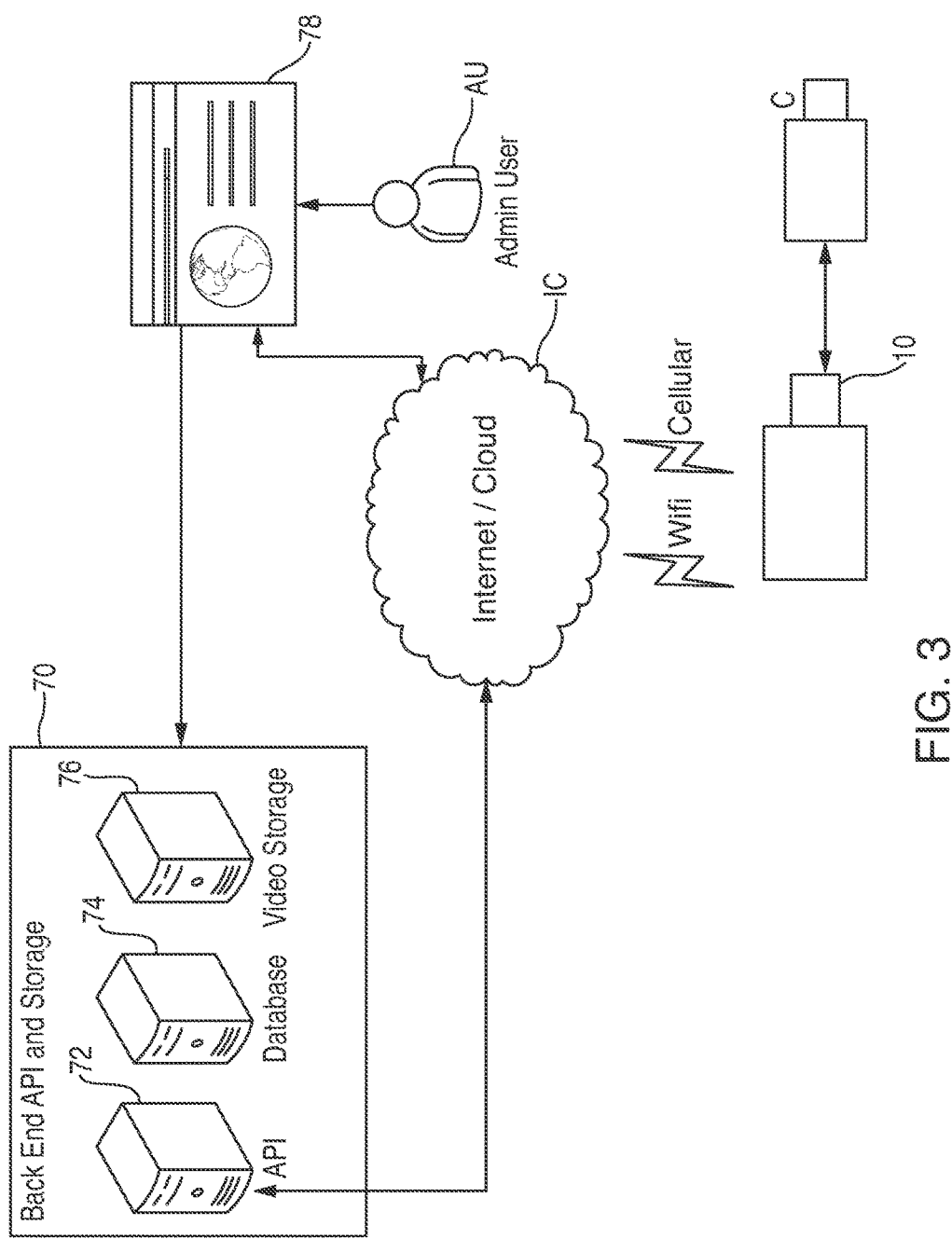
FIG. 3 is an exemplary system diagram depicting the interaction and interconnectivity among various system components in accordance with an exemplary embodiment of the present invention.

Referring to FIG. 3, there is an exemplary system diagram depicting major system components, including camera device 10 connected via Wi-Fi and cellular communication(s) over the Internet IC to administration facility 70 where back end API and storage functions take place and are maintained. It should also be appreciated that administration facility 70 includes one or more servers operated by machine-readable software instructions present on non-transitory computer readable storage media to perform a variety of functions. With respect to the hardware of the system, CPU-based hardware, computers, and/or servers are arranged to communicate with one another and with one or more databases and/or data stores, preferably residing therein, which are used to store data of the types described herein. When and after data is stored, the servers and software parse and filter the data pursuant to encoded instructions to allow a user to search for specific data. In addition to using on-site hardware and software, it should be appreciated that data may be stored, and the software with program instructions on non-transitory hardware storage media described herein, may be implemented, virtually or otherwise, utilizing secure services provided by a third party service, such as hosting services provided by Amazon Web Services.

Utilizing processer controlled hardware, computers and/or servers, administration facility 70 comprises a combination of the API 72, database(s) 74 and video storage memory unit(s) 76 for managing and storing video data transmitted by camera device 10. In an exemplary embodiment API 72 is sufficiently generalized to enable interfacing and integration of the system and its features and functions with different types of camera devices. Although represented as distinct functions taking place on distinct CPU based hardware units or servers, it should be understood that these functions can be merged into a single CPU based unit or server, provided that there is sufficient memory and processing capability to accommodate all desired functions of the system. Administration interface 78, preferably having a display and processor enabled controls operated by an administration user AU, accesses and receives data—including data from database(s) 74 and video storage 76—maintained at administration facility 70. In an exemplary embodiment, administration facility 70 and interface 78 are located at the same physical location or within a proximate distance of one another. However, it should be understood that interface 78 and one or more admin users AU may operate remotely from administration facility 70. Thus, when a hosting service is utilized, access interface 78 is at a different site from administration facility 70 where data and software is hosted. Access to administration facility 70, and changes to software and data stores can be implemented remotely via PCs, laptops and mobile devices.

Each data set introduced in the database(s) 74 (and/or storage 76) represents interrelated data sets that communicate with and rely on other data sets for complete information (but do not necessarily represent discrete data sets). These data sets may be accessed using a variety of database management systems (DBMS), including but not limited to relational database management systems (RDBMS), and "post-relational" database management systems (e.g., not only Structured Query Language ("NOSQL") database management systems), including a document oriented database system such as Mongo DB. In this manner, data sets are meant to be purely illustrative and are not intended to necessarily depict a physical housing of data. Furthermore, by using a DBMS such as RDBMS or a "post-relational" DBMS such as Mongo DB, the data may be available in a variety of manners and groupings.

In an exemplary embodiment, the primary data sets or objects utilized and recorded in database 74 include the following: Event, Camera Device, Firearm or Weapon, and User or Account, the data or information of which are each associated with one another during setup, function, operation and use of the system. For example, in an exemplary embodiment, an Event object includes the following data points: Event ID, Event Create Date, User ID/User Name (i.e., link to User who created the event), Firearm ID or Weapon ID (i.e., link to Weapon used when Event created), Camera ID, Time Stamp of Event Creation, Latitude, Longitude, Event IP Address, Live Event Video URL, Event Video URL, Video Duration.

In an exemplary embodiment, a Camera Device object includes the following data points: Camera ID, Camera Name, Camera Number, Weapon ID (i.e., link to an assigned weapon).

In an exemplary embodiment, a User object includes the following data points: Email Address, Approved (Yes/No), Locked Out (Yes/No), Last Login Date and Time, First Name, Last Name, Address, City, State, Zip Code, Age, Gender, Assigned Role(s).

It should be appreciated that other data points may be used in connection with and to further identify each of the objects referenced above. For example, sensor data that is captured, recorded and catalogued in database(s) 74 and/or video storage 76 may also be associated with any one or more of the data sets. By the same token, data points specified herein in connection with one of the objects may be transposed to and used with other objects as well.

In an exemplary embodiment of the system, camera device 10 is operatively connected to one or more other cameras C that are physically separate from camera device 10 but which are in operative and coordinated communication with one another, such as by Bluetooth or other direct communication or indirect network communications. Although FIG. 3 illustrates direct connectivity between firearm-mounted camera device 10 and other cameras C, it should be understood that other cameras C may be connected and receive control signals via a network (such as the Internet) directly from, for example, admin users AU operating admin interface 78. When available, other cameras C are generally configured to turn on and begin recording (as well as turn off and cease recording) in conjunction with firearm-mounted camera device 10. Thus, when firearm-mounted camera device 10 is switched on whether as a result of its removal from its holster or otherwise, other cameras C receive a signal to do so as well. Likewise, when firearm-mounted camera device 10 captures, records and/or transmits video data, audio data and/or other sensor data, other cameras C do so as well, when same are available. In an exemplary embodiment of the present invention other cameras C comprise, for example, cameras worn on the body of a user, cameras positioned in a support vehicle, or cameras positioned in the local area.

Figure 4:
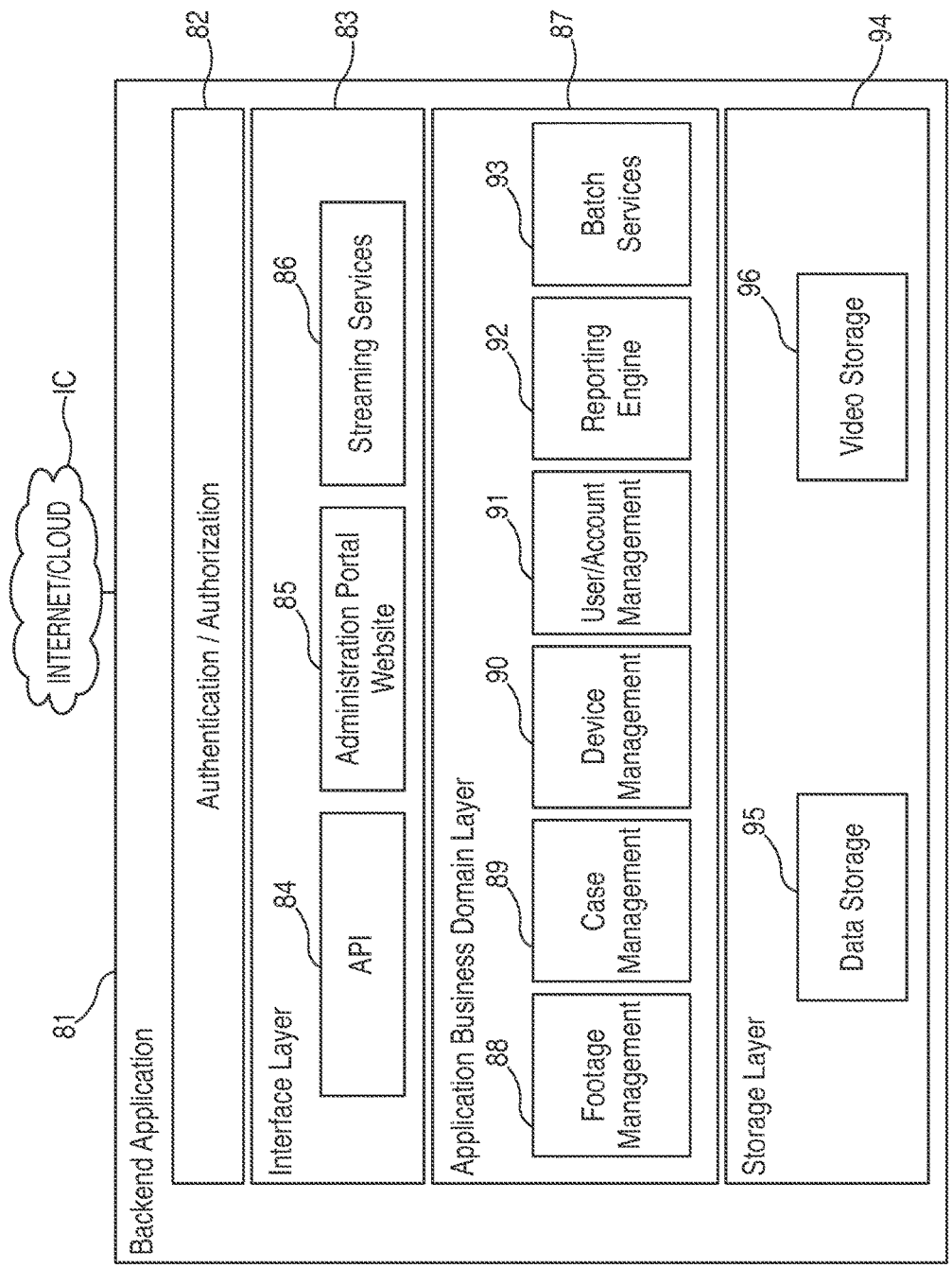
FIG. 4 is a block diagram of the backend framework and corresponding software application modules in accordance with an exemplary embodiment of the invention.

With reference to FIG. 4, there is shown a graphic overview of an exemplary embodiment of the backend system application 81, preferably located at administration facility 70, that controls the administration operation of the system and which is also utilized to send control signals and instructions to a firearm-mounted device 10 (and other cameras C). The backend of the system comprises a hardware configuration having one or more processor-based machines, such as computer(s) or server(s), with a hard disk or memory drives running software comprising machine-readable instructions. Server(s) serve(s) as and/or provide(s) access to a data warehouse and is operatively connected to the Internet. Data warehouse comprises one or more databases configured as a conventional database system having read and write accessibility using a database management system and/or software.

The backend application 81 is a cloud-based service or SAAS ("software as a service") that provides user software, integration logic and program instructions. Accordingly, it should be understood that a preferred embodiment of the present invention is implemented primarily, but not exclusively, as a web-based system with accessibility to the system and its API 72, database(s) 74 and storage 76 via an open distributed computer system, such as the Internet. Moreover, while the description of the exemplary embodiment of the system is with reference to a single server and storage device, it should be appreciated that a number of servers and storage devices may be utilized in tandem to implement the system.

Upon a request for access by an administration user or camera device 10 user, an authentication and authorization module and instructions 82 are provided to discretely permit access to authorized individuals and devices. Depending on the assigned User Role, users are provided access to discrete data, and interfaces. Some roles permit unfettered access, others permit input, editing and deleting data, and others are limited to 'view' or 'read' only. An interface layer 83 is also provided with selected modular components and instructions including an API 84, administration portal website 85 and streaming services 86. With regard to the API 84, camera device 10 is provided with a set of end point(s) to which to transmit data to, including data about status changes, registration and logging, captured video data transmitted for viewing and storage, and negotiation and management of streaming events for the firearm-based device.

The Application Business Domain Layer 87 encompasses all logic and program instructions maintained and updated on a non-transitory storage medium for the SAAS implementation. It is divided into the subsystems that are described hereinbelow. Video data (and other data) that is captured is managed over their lifespan to ensure that a chain of custody can be verified when the software is utilized or reviewed. Video and other data pertaining to captured video is organized and stored in database 74 and video storage 76 and maintained by database management software.

Footage management module 88 encompasses activities relating to video data, audio data, and other sensor data that are captured and stored. A chain of custody relating to these data is mapped during their lifespan. Processes and data that are maintained and acted upon via footage management module 88 include: (1) acquiring, organizing, and securing video data, audio data and/or other sensor data that are captured and uploaded by camera device 10; (2) coupling or associating the video data, audio data and/or other sensor data with metadata related to the video (e.g., address, city name, state name, zip code and/or GPS coordinates, date, time, officer name or ID, event ID, camera device ID, firearm ID, axis data coordinates from accelerometer); (3) initiating and maintaining chain of custody information for video data, audio data and/or other sensor data that are captured and uploaded by camera device 10, including, without limitation, (i) date and time when video data, audio data and sensor data is accessed; (ii) identification of individual/entity that accessed the footage; (iii) identification of individuals/entities with which footage is shared; (iv) what share revocations exist; (v) cases associated with the video data, audio data and sensor data; and (4) archiving and removing of videos pursuant to predetermined storage rules and predetermined purge rules. In a preferred embodiment, footage and/or events associated with footage are stored for a predetermined period of hours, days, months or any other designated period of time. After the selected predetermined period of time, footage is automatically removed or washed.

In an exemplary embodiment of the present invention, there is a case management module 89. The function of module 89 is to maintain, organize and associate video data (as well as corresponding audio data and sensor data) with a particular case for which an event or events are captured, recorded and stored. Through accessing and using the case management module 89 and data associated therewith, an authorized user is able to search for cases and to search using criteria common to more than one case. Case management module 89 enables the association of multiple events (e.g., from different officers) to a single case management file or folder. Access to a case can be provided to any number of authorized users, based on permissions. Likewise, data from a case can be exported for external consumption. Generally, a case management file or folder comprises the following: (1) Case Identifier (e.g., name or description or ID number); (2) Case Creator (e.g., name of individual that commenced the case); (3) Case Creation Date and Time; (4) Notes and Comments associated with the case; (5) one or more videos (and other associated data); (6) Share Function to share case management file or folder with other authorized users. After these data are input and features are enabled, an authorized user can search for cases, review details of a case, associate and disassociate evidence from a case, annotate a case, and change status of a case. In particular, with regard to a case search, an interface is provided using the following descriptive search fields: Case Name, Case Description, Case ID, Case Create Date, Case Created By, Case Modified Date, Case Modified By. In using the search function, only authorized users will be permitted to search for cases. Likewise, if a case is deemed restricted, a case will only be visible to those users have an increased level of case search authorization. Case authorization can be provided through enabling certain hierarchical roles so that users in a particular role (or in a higher role) have access.

Camera device management module 90 capabilities, including controls and instructions are also provided. The functions include registration, validation and monitoring of camera devices. A camera device within the backend is a reference object that is associated in a one-to-one fashion with a physical camera device and consists of the following attributes: (1) a unique identifier or Camera Device ID that can be used to identify the camera device; (2) a date of service for the device; (3) RMA information associated the device; and (4) notes recorded by an Armorer pertaining to the camera device. Other data points include Camera Number and Weapon ID, which demonstrates the firearm to which a camera device is assigned.

Backend application also includes user management 91 control and instructions that organize and control for all users within the SAAS service. For example, user management module 91 provides the ability to set user authorization settings via a role-based interface. The systems enables: administrative input of users into the system with access thereto; role-based security that grants and restricts access to system resources including: (1) a function that enables authorized users to create/view/delete/share cases; (2) a function that enables authorized users to manage camera devices and their properties; (3) a function that enables authorized users to view reports from reporting engine; (4) a function that enables authorized users to manage other users within the system; (5) a function that enables authorized users to manage which parts of the site are visible to other users. Some of these functions and the interfaces therefor are presented in FIG. 16 through FIG. 20.

With respect to access of data that is obtained and captured, data can be accessed via department policies set by each department, to include typical forensic metrics. Forensic metrics include metrics that are, for example, attributable to how and in what manner a user/police officer used a weapon. This may include, for example, number of shots fired, shot succession, direction (on x, y, z plane), vibration, shaking hands, kinetic energy and other metrics attributable to use of a weapon by a police officer. Although all metrics may be available in the system, limits and authorization requirements may be placed on some metrics before access is provided. In that regard, information pertaining to individual officers and his/her use of a weapon may be restricted when desired. However, information relating to the number of shots typically fired in an encounter may be provided as statistical data is gathered.

Other elements include a reporting engine 92 that provides organization and filtering capabilities to review and filter through vast amounts of data and content maintained and stored on the system and its databases/data storage. Reporting engine module 92, for example, maintains, accesses and provides physical and web-based reports on logging data of camera devices, event data (and all other forms of data associated with one or more events), as well as chain of custody data for evidentiary purposes and subsequent review for evidence and trial.

For system management purposes, a batch services module 93 is also provided and used to remove old footage and report generation on batch jobs that can be performed. Likewise, batch services provide for the generation and transmission of emails to users and authorized personnel pertaining to, for example, subscription notices and sharing notifications of video, event and other data. Batch services 93 are also used in connection with pre-building reports generated by the system.

Data Storage 95 and video storage 96 is provided at the storage layer 94. Data Storage 95 serves to secure and store all SAAS data that has been created and maintained within the Application Business Domain Layer 87. By the same token, video storage 96 services to secure and store all videos captured by camera device 10 (and any related and accessible other cameras C). Although data storage 95 and video storage 96 (as well as their physical counterparts database(s) 74 and video storage 76) are graphically depicted as separate elements, it should be appreciated that they may be combined. Generally, while video data may be stored separately from other data pertaining to that video, it should be appreciated that the sensor, audio, time and other data that pertain to a particular piece of video, are associated and linked to one another. In an exemplary embodiment, a document oriented database such as Mongo DB is utilized for the storage, access and retrieval of data and video.

It should be understood that the camera device, system and methods disclosed herein can be implemented across many different private and public entities, municipalities and local, state and federal entities, while maintaining the integrity and the discrete nature of the data that are captured, recorded and stored. Therefore, in a preferred embodiment of the present invention, there is no cross-exposure of data, each entity is in control of its own databases and storage, and each entity maintains and controls its own users, access and review protocols. Accordingly, while the system and databases and data storage disclosed herein provide for multi-tenancy among different institutions or municipalities, it should be understood that there is preferably no cross-exposure among them (subject, of course, to the intentional and approved release of data).

In addition, since all video data, audio data, sensor data and other data that are captured are likely to be subject to subsequent access and review, it should be appreciated that the device, system and methods disclosed herein are implemented utilizing criminal evidence and custody protocols that are accepted and known in the art for purposes of audit tracking all evidence that is obtained.

Figure 5:
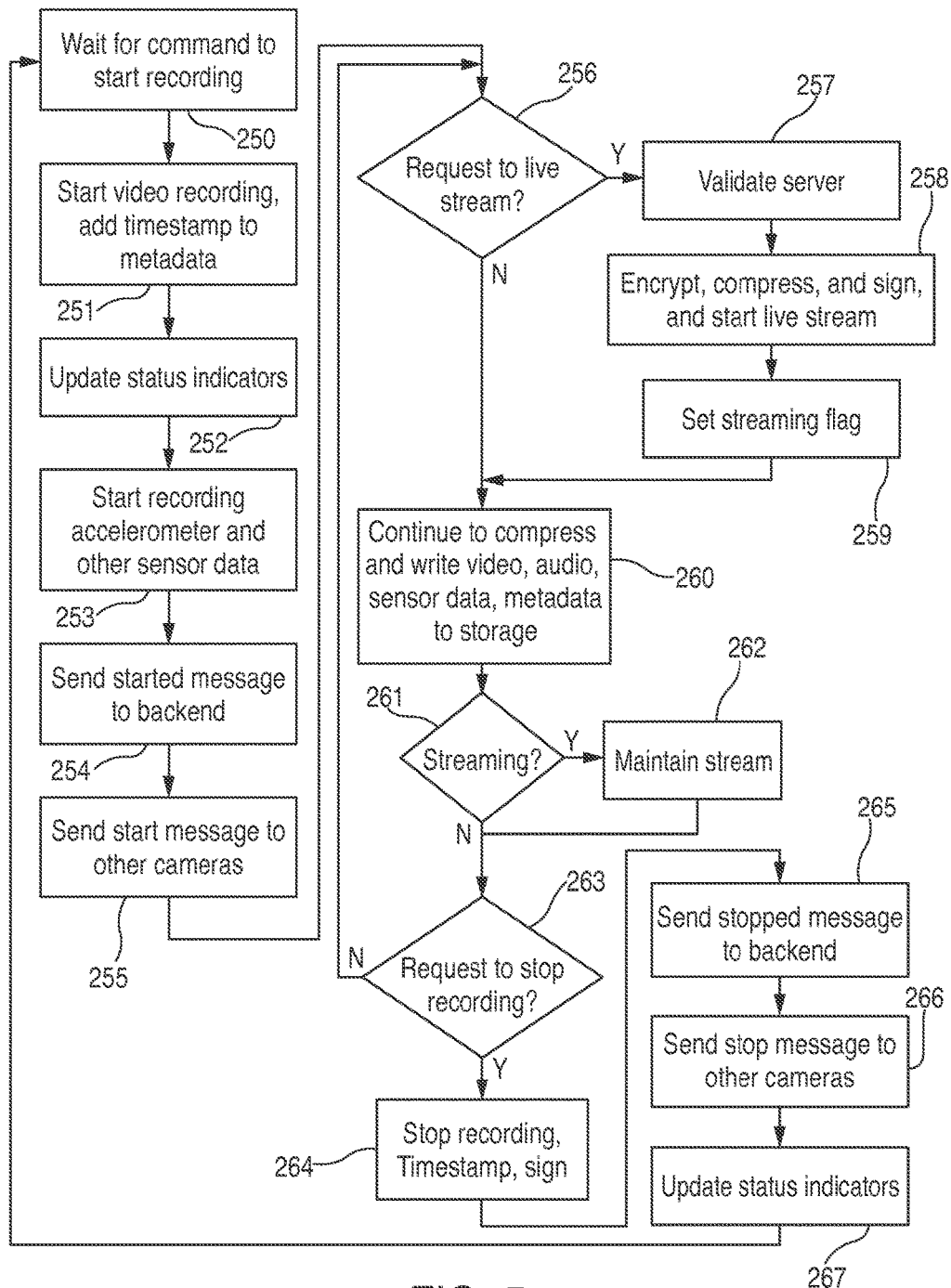
FIG. 5 is a flow chart depicting an exemplary process for data capture—including video, audio, sensor and other data—by a firearm-mounted electronic device and system of the present invention.

A flowchart illustrating an exemplary process for video and other data capture is presented in FIG. 5. The commencement of the recording process 250 begins with a request or signal to begin recording video 251. A control signal to begin recording may be given locally by a user holding camera device 10, or by other local devices 10 and cameras C. A signal to commence may also be provided based upon data received by sensor inputs or holster inputs which generate instructions and controls to begin recording. For example, a signal to commence may be provided in conjunction with and upon the unholstering of a firearm carrying firearm-mounted camera device 10. (Likewise, a signal to cease recording may be provided in conjunction with and upon the holstering of a firearm carrying the firearm-mounted camera device 10.) A control signal to commence recording may also be provided remotely by an admin user AU or via control signals initiated at the backend of the system while executing programmatic software instructions residing in a hard drive or other storage device, or via controls at admin interface 78. Once a start signal 251 is given, video (and audio) capture and recording are initiated. In an exemplary embodiment, all video is time-stamped and other metadata are inserted, such as Camera ID, Weapon ID, User ID, and Location with latitude and longitude coordinates. Preferably, recorded video is encrypted when saved locally to memory, typically an SD card.

In conjunction with the start recording signal 251, status indicators are updated 252 to indicate that recording has started. A typical status indicator may incorporate a red led light or other visual indicator. Optionally, depending on the available system and control functions, sensor-data (e.g., provided by an accelerometer) and/or audio-data are also recorded 253, encrypted and saved to memory, in conjunction with video. Once data capture has begun 251, 253, a signal is sent to administration facility 70, which in turn is available to admin user AU at administration interface 78, to indicate that camera device 10 has begun recording 254. Depending on the local availability of, and connectivity with other cameras or recording devices, a signal is sent, such as via Bluetooth, to other available cameras C or camera devices 10 to begin recording as well. A signal may be generated and originate programmatically based on program instructions, or based on a command given by an admin user AU, or locally by a user's camera device if it is with a particular predetermined range to other locally availably cameras/recording devices and sensors that are operatively connected to camera device 10. In a preferred embodiment, once a signal that recorded has commenced is sent 254, that signal may serve to trigger an emergency alert notification signal trigger to alert other officers and camera devices 10 in the vicinity.

Once recording commences, camera device 10 checks to determine whether communications, such as Wi-Fi and/or cellular communications, are available to permit transmission of video (and other data). When one or more forms of appropriate communications are available, a request asking whether camera should send a live stream video 256 is made and acted upon. If live streaming is requested, a stream is set up by first validating and properly encrypting/decrypting the data and setting the appropriate compression rate 257, 258, 259. Both with and without live streaming, video, audio, sensor and timing data continue to be compressed and recorded or written to a file in local non-removable storage 260 at camera device 10. Preferably, the video, audio, sensor and timing data (and other data) are all encrypted to prevent unfettered and unauthorized access. Video and other data may also be transmitted, saved and written to a file that is remotely located at database 74 and storage 76. If streaming the video being captured (along with time and other data), the video stream is maintained 262 until a query is made asking whether to stop recording 263 and a signal is sent to camera device 10 to stop recording 264. The request to stop recording 263 can be initiated locally at camera device 10 or remotely via the backend application and users thereof. If no stop signal is presented 264 upon the query 263, a loop is created to query and control whether or not the stream should continue. When the stop signal is generated 264 it is sent to backend 265 and other local cameras 266 which act in accordance with the control signal. Likewise, status indicators are updated to indicate that recording has stopped. At that point the system is brought back to the original state at the commencement of the recording process 250.

With reference to FIG. 6 through FIG. 20, there is illustrated an exemplary embodiment of a series of graphical user interfaces and displays provided at admin interface 78 for managing access, user management functions, firearm management functions, event management functions and camera management functions and displaying information associated with each.

Figure 6:
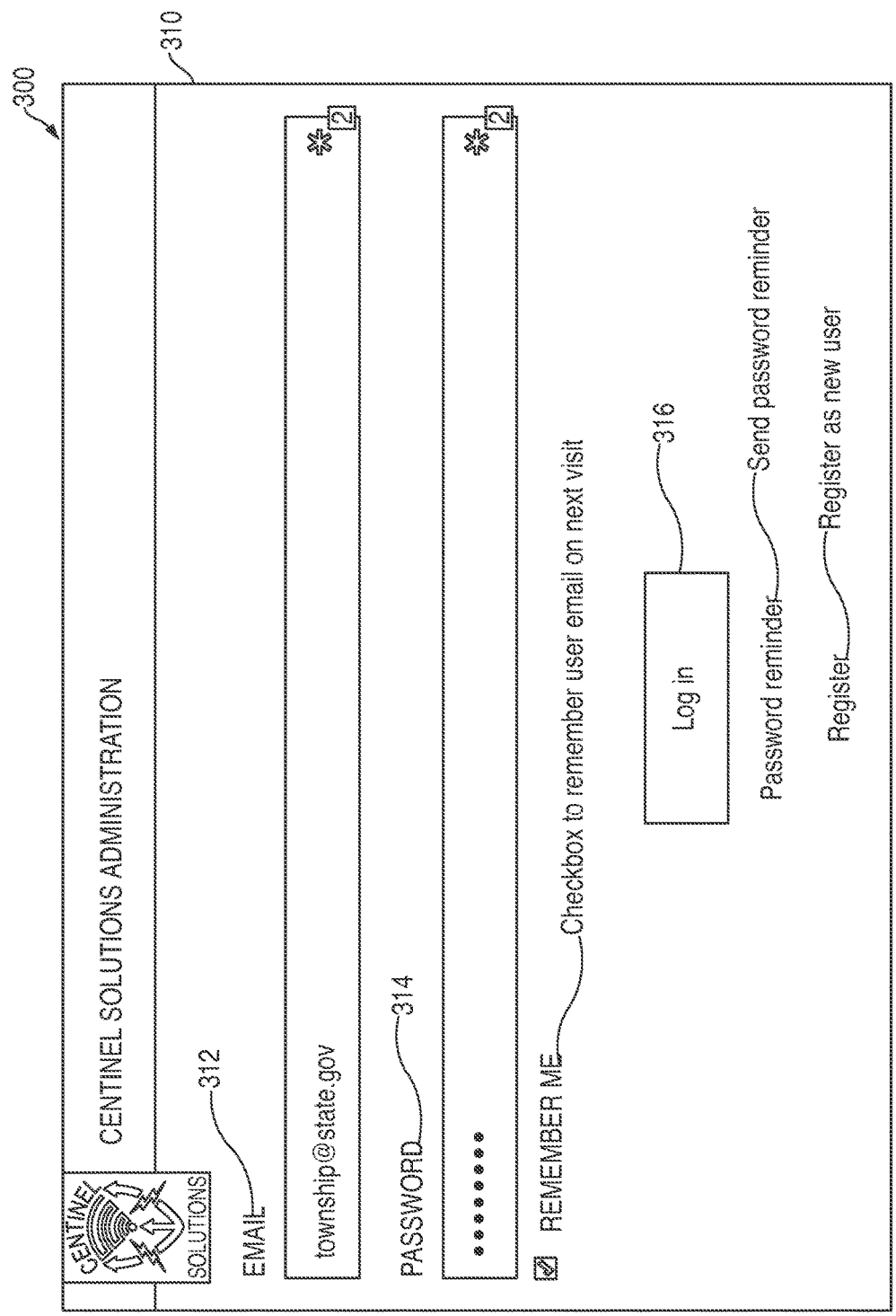
FIG. 6 illustrates an exemplary graphical user interface or display of an administrative or user login in accordance with an exemplary embodiment of the claimed invention.

As illustrated in FIG. 6, administrative users AU gain entry and access to a graphical user interface 300 by subscription and by using known security approaches, via a login screen 310 such as an email login 312 and password 314 (entered into corresponding fields of entry on the interface), which are optionally managed by a separate login server (not shown). Once a login is confirmed by pressing on login button 316 and an administrative user AU authenticates, access is provided to administrative user AU to management functions.

Figure 7:
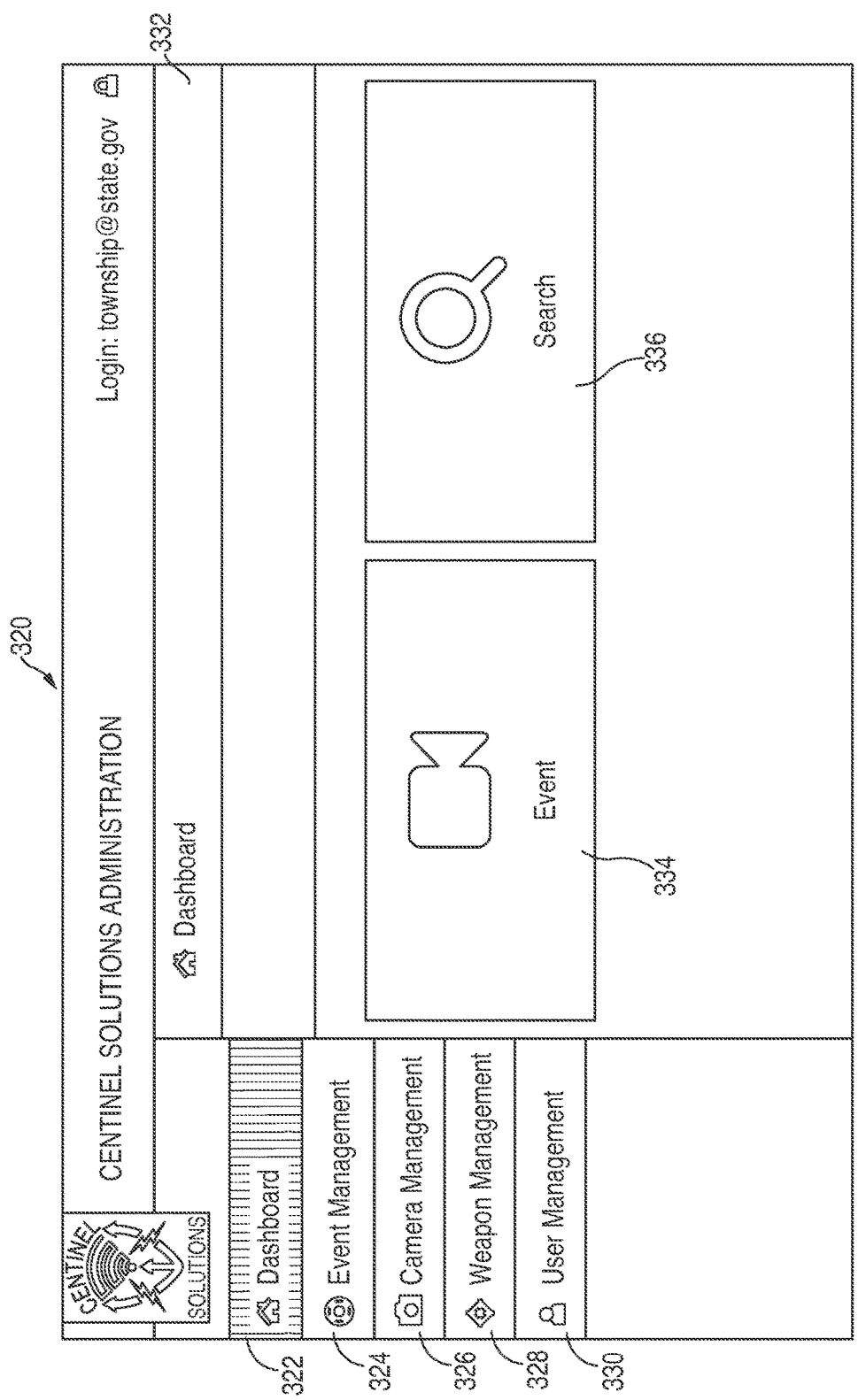
FIG. 7 illustrates an exemplary graphical user interface or display of a dashboard function and information display for viewing and searching events in accordance with an exemplary embodiment of the claimed invention.

After login, a landing page or dashboard 320 is provided and displayed, as illustrated in FIG. 7. On the left side, beneath dashboard button 322, a series of buttons or tabs are provided to access functions pertaining to Event Management 324, Camera Management 326, Firearm or Weapon Management 328 and User Management 330. In an exemplary embodiment, across the upper section or top of dashboard interface 320, "breadcrumb" navigation means 332 is provided as a navigation aid to inform and help administrative user AU keep track of locations within the system and graphical interfaces provided for management of functions. In the body of the dashboard 320 a link is provided to an Events page or interface 334 or a Search page or interface 336.

Figure 8:
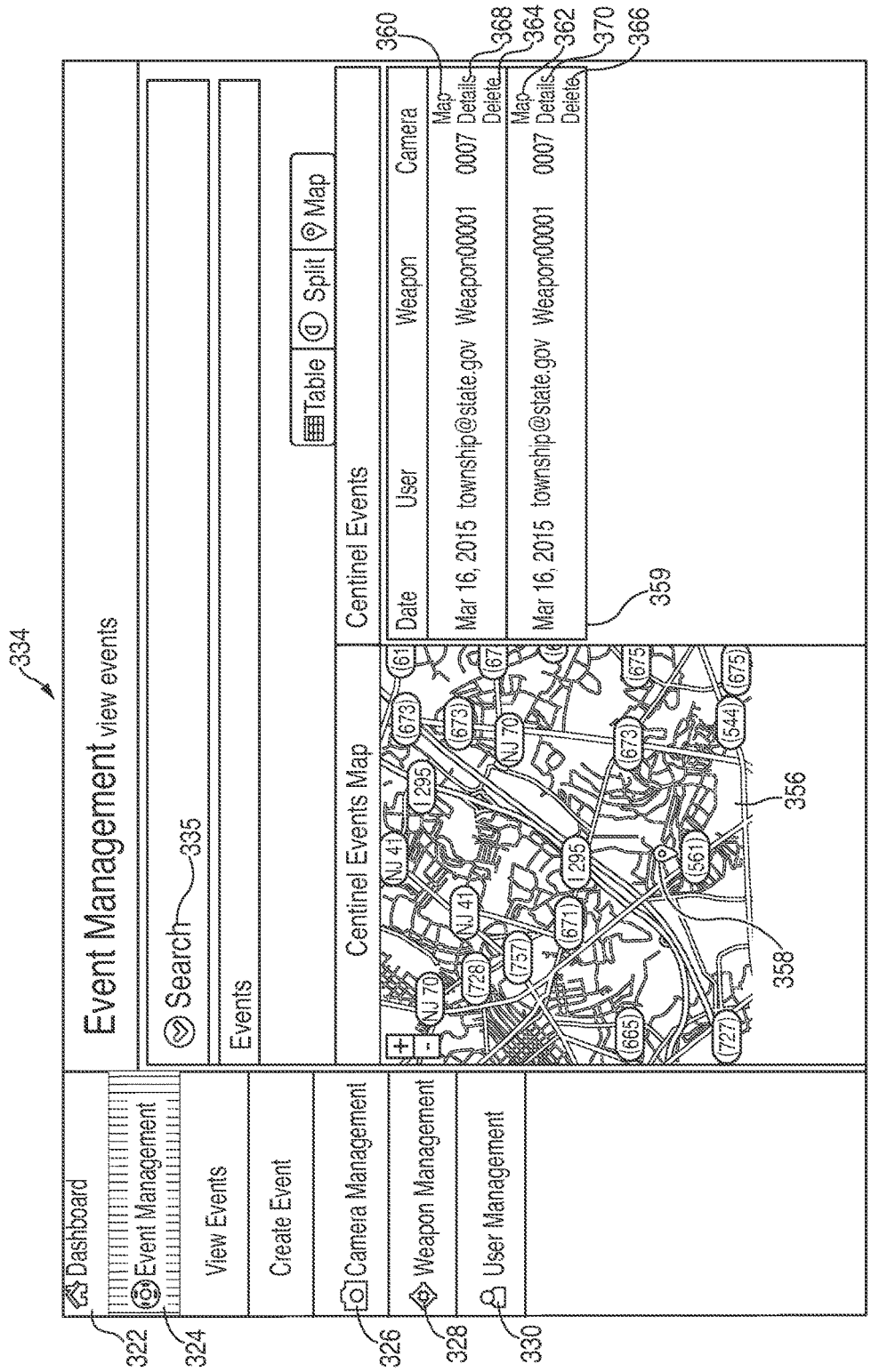
FIG. 8 illustrates an exemplary graphical user interface or display of an event management function and information display for a series of events associated with a firearm-mounted electronic device of the present invention.

FIG. 8 illustrates an exemplary embodiment of an Event Management graphical user interface 334. Across the upper portion or at the top of Event Management interface 334, a Search link or button 335 is provided to enable an administration user AU to search for specific events using selected search criteria using Search interface 336.

To enable the proper operation of the search function utilizing Search interface 336, events are listed, recorded and catalogued in a database comprising a non-transitory storage medium located at administration facility 70 by, at least, the following identification information or identifiers: Date of Event, Event ID (i.e., manually assigned or computer-generated unique identifier for an Event), User ID, Firearm or Weapon ID, Camera Name, Camera ID and City Name. In addition to the foregoing, other identifying information may be used to classify events to for search, filtering and isolation, including: Badge No., Officer Name, Zip Code, State Name, County.

Figure 10:
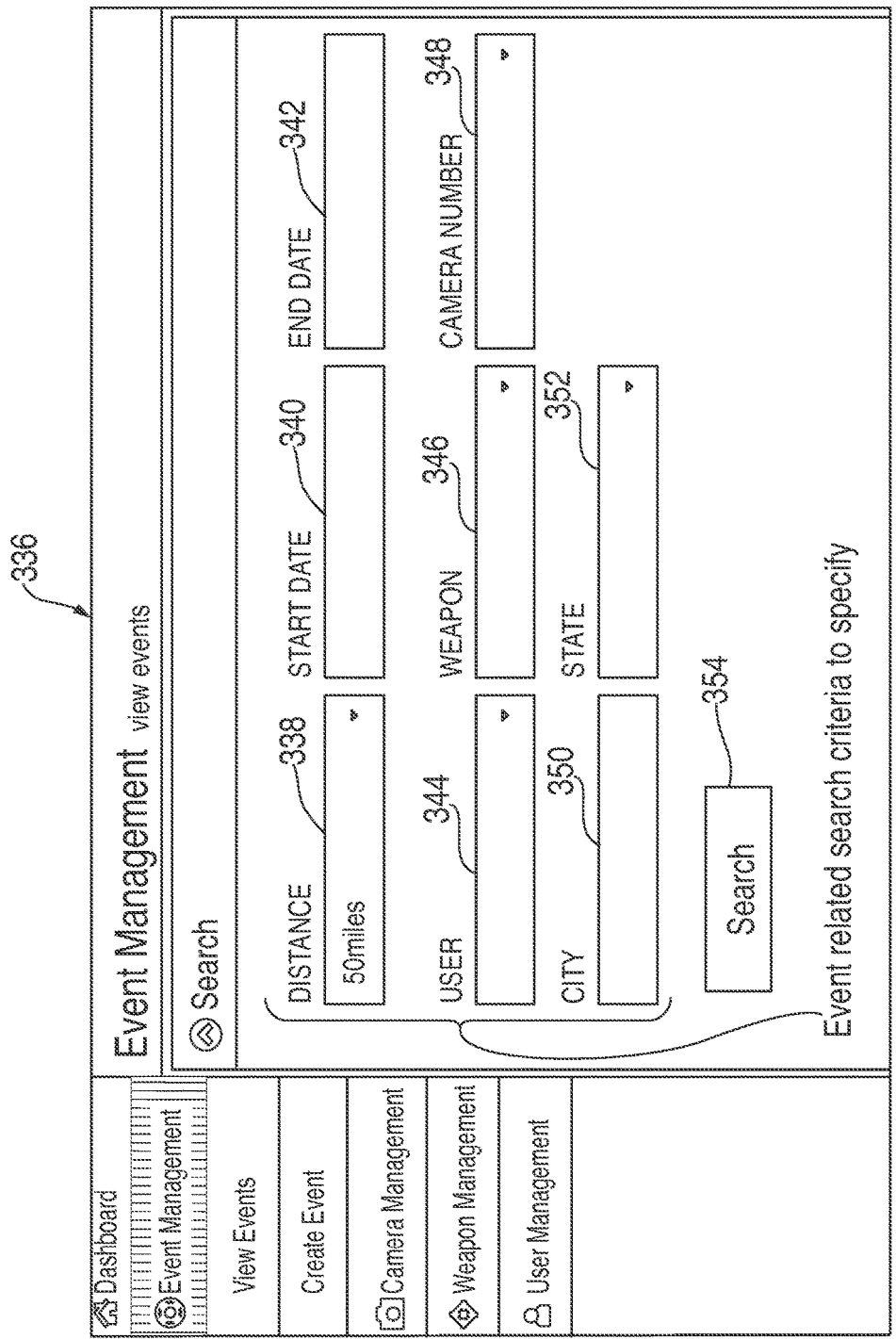
FIG. 10 illustrates an exemplary graphical user interface or display of an event management search function and information display in accordance with an exemplary embodiment of the claimed invention.

In an exemplary embodiment illustrated in FIG. 10, Search interface 336 includes the following fields for search: Distance 338, Start Date 340, End Date 342, User (e.g., User ID) 344, Weapon (e.g., Weapon ID) 346, Camera Number (e.g., Camera ID) 348, City Name 350 and State Name 352. After criteria for these fields are entered, a user of interface 336 selects the Search button 354 to perform a search. Through the entry or selection of a distance parameter in the field called Distance 338, Search interface 336 enables searches for events within an identified radius (typically provided in miles or kilometers) of the City identified in the City Name field 350. Although many parameters are presented in Search interface 336, it should be understood that information may be provided for fewer than all parameters, under which circumstances, true results or "hits" that correspond to the parameters that have been populated are listed.

Event Management interface 334 further comprises a map area 356 which illustrates streets, roads and highways. Provided in map area 356 is marker 358 which identifies the location of a firearm-mounted camera device 10 (and/or its user) at the time of an event and location of an event. In the exemplary illustration of FIG. 8, two events are listed in a table 359. Other buttons are also provided to toggle between a "table view," where only the table of events is displayed; a "split view" where both a table of events and map are displayed; and "map view" where only a map is displayed. In this instance, marker 358 refers to the first listed event, which appears by default as the marker corresponding to the first listed event from a search using Search interface 336, or in response to pressing Map button 360. To toggle map area 356 to a different map for the second listed event, Map button 362 is actuated. When toggling, a new marker (not shown) for the precise location in the map when the listed event is occurring or has occurred is shown. Delete buttons 364, 366 are provided to delete the listed events. In a preferred embodiment, authority to delete events are limited to ensure that all events are available for review.

Figure 9:
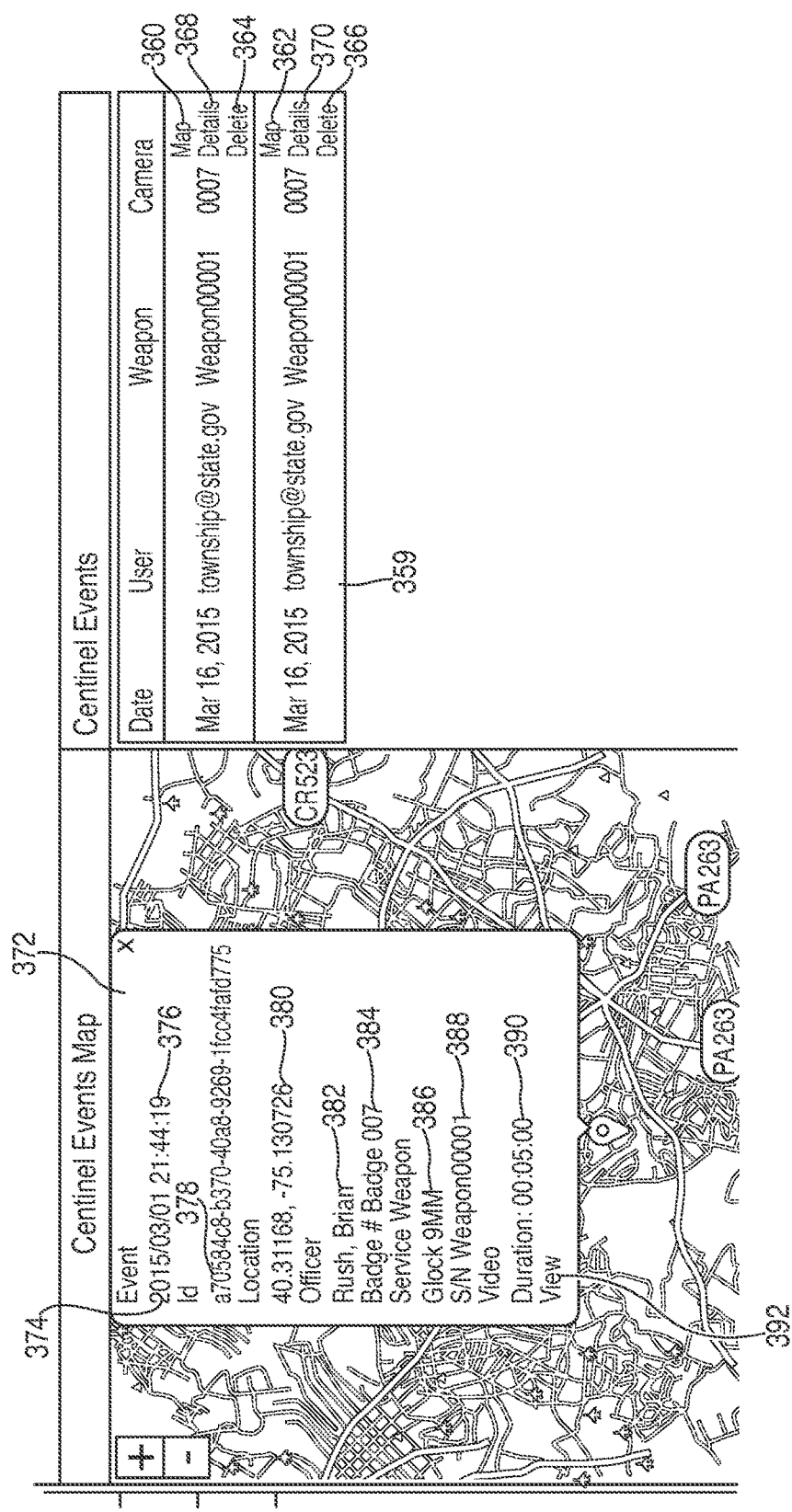
FIG. 9 illustrates a further exemplary graphical user interface or display of an event management function and information display for a series of events associated with a firearm-mounted electronic device of the present invention, with additional details of an event.

In addition to basic information provided in table 359, further details pertaining to specific events are available by pressing Details buttons 368, 370. Upon accessing the details, an Event popup 372 is presented on Event Management interface 334, as illustrated in FIG. 9. In an exemplary embodiment, event popup 372 includes the following data which are also listed, recorded and catalogued in a database comprising a non-transitory storage medium located at administration facility 70: date of selected event 374, time of selected event 376, the Event ID 378, location coordinates of event 380, Officer name 382, Badge number 384, Firearm Type 386, Weapon ID 388 and Video Duration 390. From event popup 372, a View link 392 is also provided which enables a user to access and view the video (and audio) that was captured, recorded and stored at administration facility 70 for the event.

Figure 11:
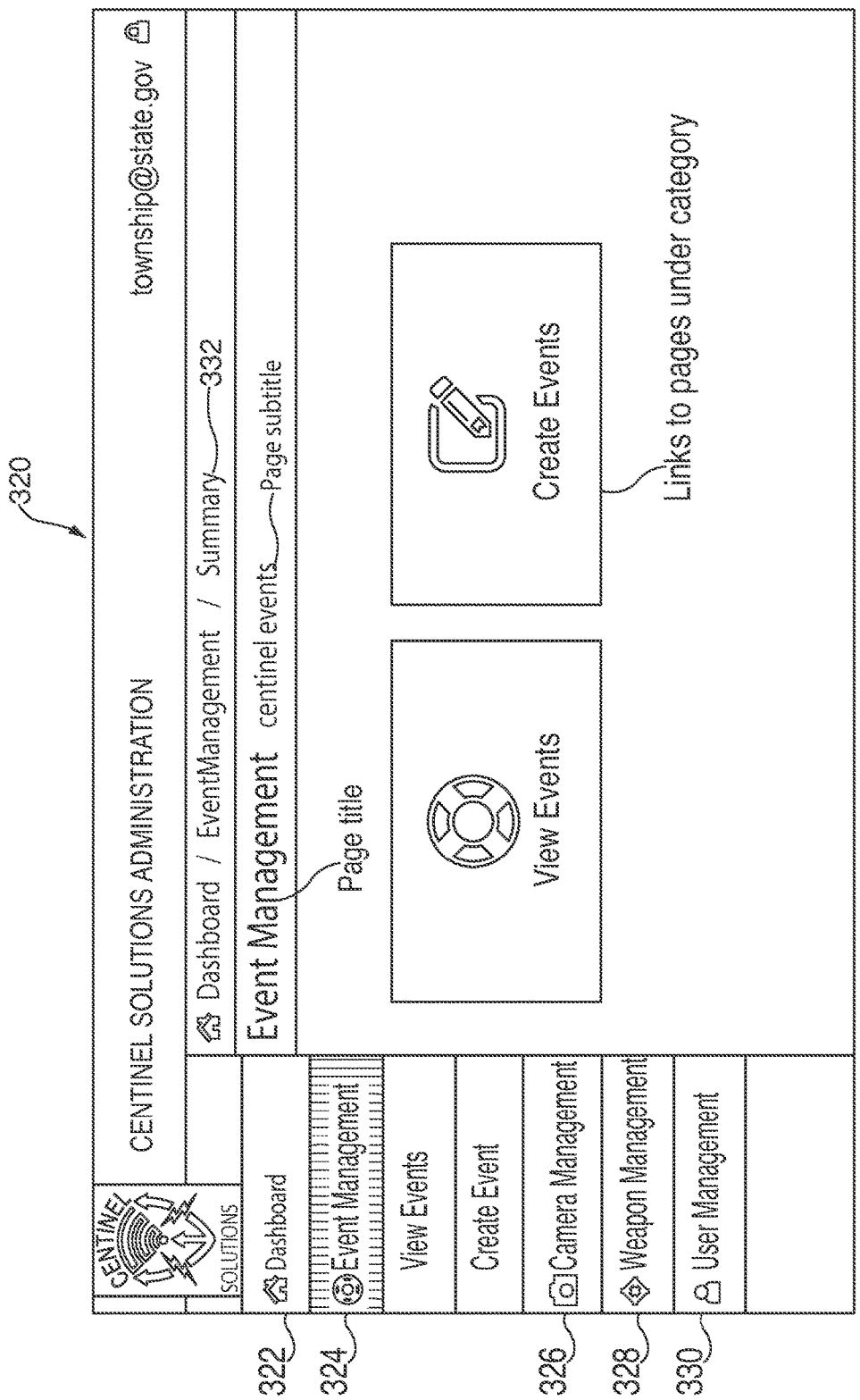
FIG. 11 illustrates an exemplary graphical user interface or display of an event management view function and event management create function and information display in accordance with an exemplary embodiment of the claimed invention.

In addition to viewing events via interface, FIG. 11 illustrates an additional interface via which an event can be created. In an exemplary embodiment, an Event with an associated identifier are created automatically as camera device 10 transmits (or otherwise transfers) video and other sensor data via the API 72, whether via Wi-Fi, cellular, Bluetooth or USB. However, events can also be created manually by assigning video footage (and other sensor data), and other identifiers, such as Weapon ID, Camera ID, User ID, Date, and other information to a new event that is created.

Figure 12:
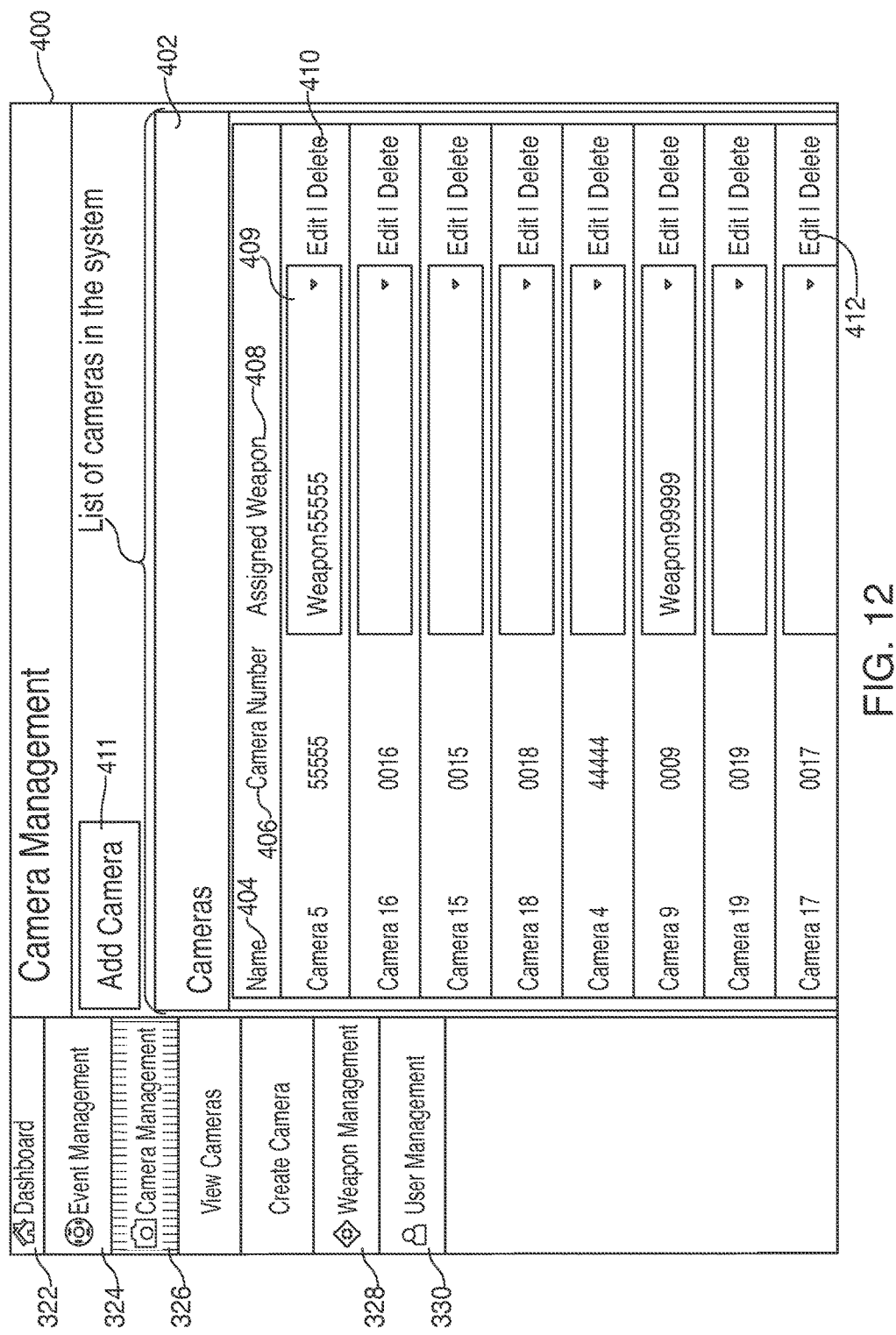
FIG. 12 illustrates an exemplary graphical user interface or display of a camera management function and information display in accordance with an exemplary embodiment of the claimed invention.
Figure 13:
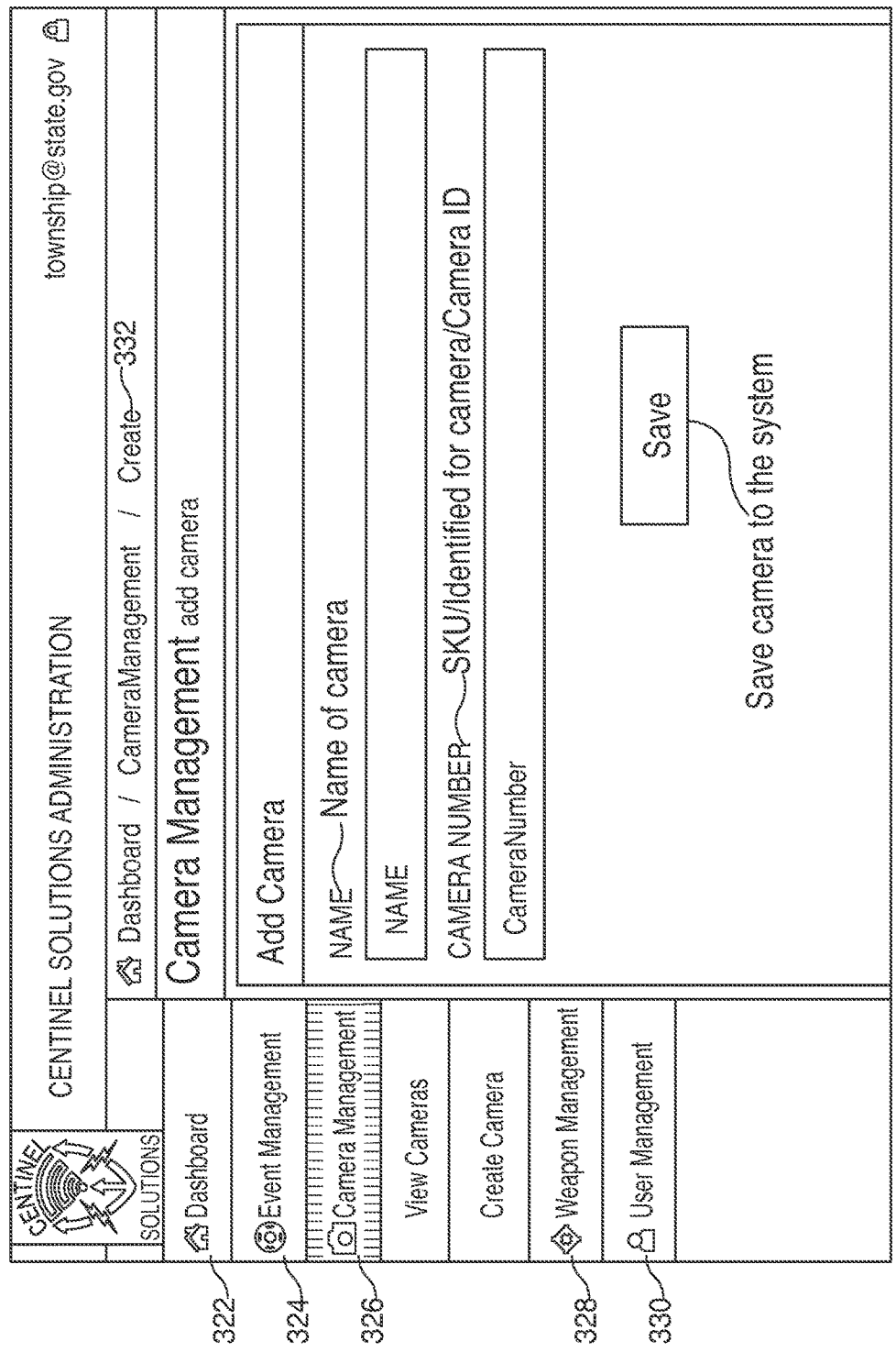
FIG. 13 illustrates an exemplary graphical user interface or display of a camera add function and information display in accordance with an exemplary embodiment of the claimed invention.

Referring to FIG. 12 and FIG. 13, there is provided an exemplary embodiment of a Camera Management interface 400 of the present invention. As illustrated in FIG. 12, Camera Management interface 400 provides a table 402 which lists each camera device 10 by Camera Name 404, Camera ID 406 and the Firearm or Weapon ID 408 to which each camera device 10 is assigned. Preferably each camera device 10 listed in table 402 should include both a Camera Name 404 and Camera ID 406. However, utilizing either a unique Camera ID or unique Camera Name alone for each camera device 10 is sufficient.

Notably, each camera device 10 listed in Camera Management interface 400 is either associated with a firearm or unassociated. This enables each listed camera device 10 to be associated with a given firearm at a particular time and then either unassociated or re-associated with a different firearm at a later point in time. This feature and function is enabled by utilizing the dropdown menu 409 listing the Weapon ID.

When a camera device is taken out of service, the camera device is deleted. This feature and function is enabled via Delete link 410. By actuating the Add Camera link or button 411, Camera Management interface 400 also enables a new camera devices to be added to the system, and providing an interface for adding a camera as presented in FIG. 13, where Camera Name and Camera ID are input and saved. Upon being saved, this data is recorded and stored at administration facility 70. By actuating the Edit link or button 412 situated adjacent to Delete link or button 410, Camera Management interface 400 also enables information for existing camera devices to be edited. The edited information may include the Camera Name and Camera ID which is saved after changes are made. Upon being saved, this data is recorded and stored at administration facility 70. For security purposes, the time that a change is made, and the identification of each individual making each change in an association of a camera device 10 to a firearm is captured, logged and recorded for subsequent access and review. By the same token, the same information is tracked when a camera device is deleted and when information pertaining to a camera device is edited. Most preferably access to these functions of adding, editing or deleting a camera are limited to a small group or single authorized administrative user.

Figure 14:
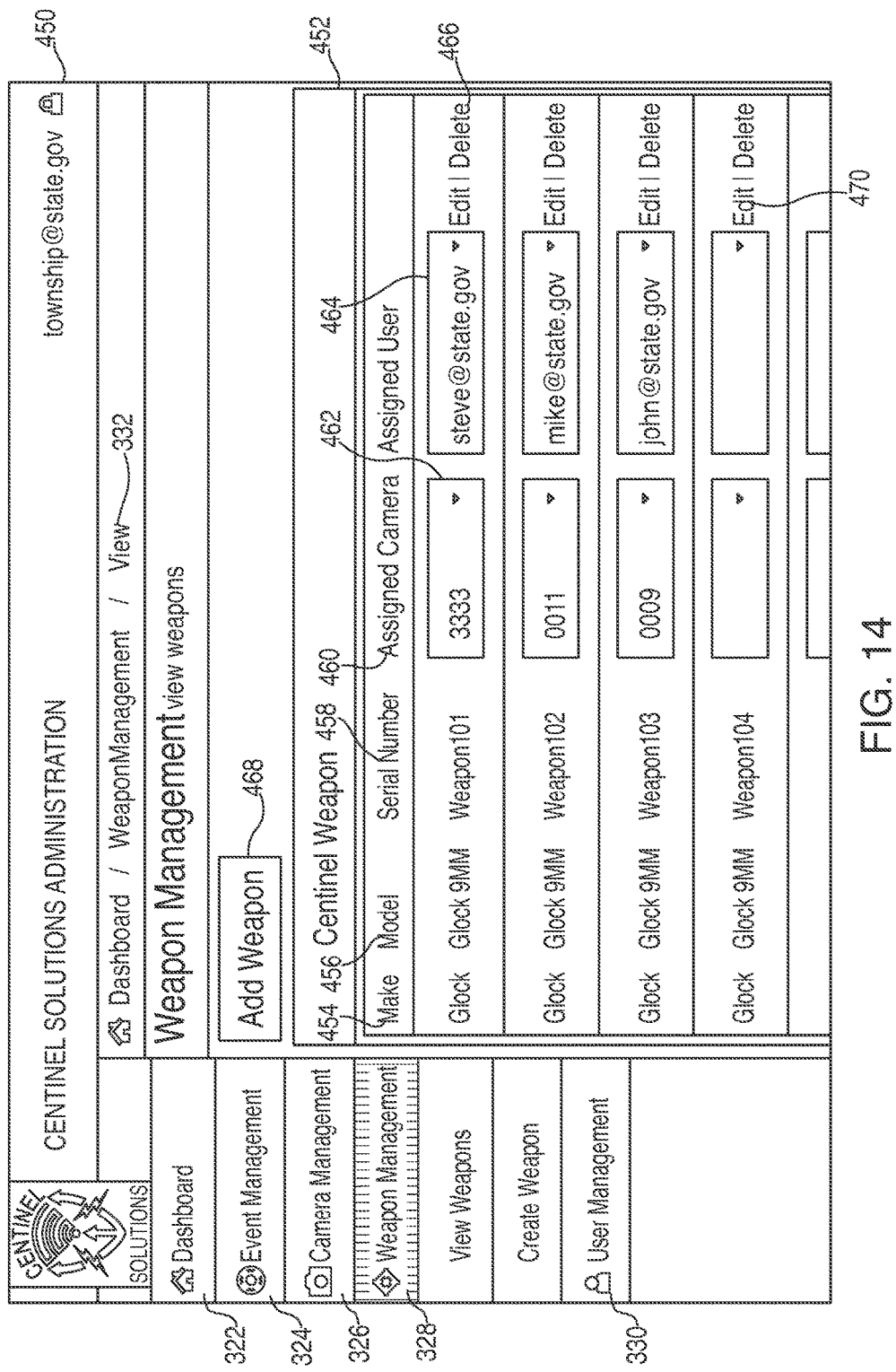
FIG. 14 illustrates an exemplary graphical user interface or display of a firearm or weapon management function and information display in accordance with an exemplary embodiment of the claimed invention.
Figure 15:
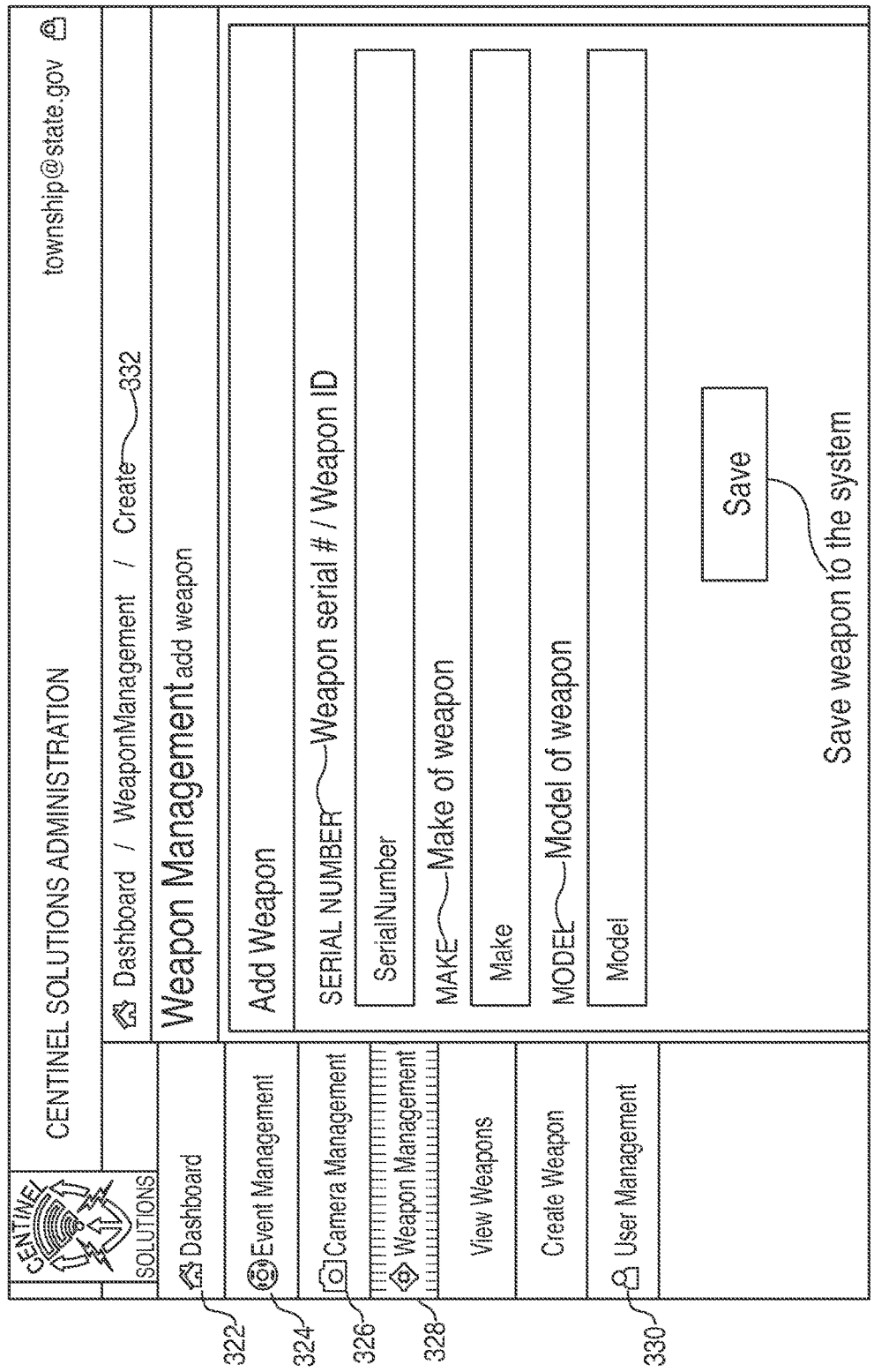
FIG. 15 illustrates an exemplary graphical user interface or display of a firearm or weapon add function and information display in accordance with an exemplary embodiment of the claimed invention.

Referring to FIG. 14 and FIG. 15, there is provided an exemplary embodiment of a Weapon Management interface 450 of the present invention. As illustrated on FIG. 14, Weapon Management interface 450 provides a table 452 which lists each firearm or weapon by Make of Weapon 454 (e.g., Glock), Weapon Model 456 (e.g., Glock 9MM), Firearm or Weapon ID or Serial Number 458 and the Camera ID 460 for the camera device 10 to which each weapon is assigned. Preferably each weapon listed in table 452 should include data for the Make of Weapon 454 (e.g., Glock), Weapon Model 456 (e.g., Glock 9MM) and Firearm or Weapon ID or Serial Number 458. However, utilizing a Firearm or Weapon ID or Serial Number 458 may suffice, particularly if the identification corresponds to the same number on the weapon.

Notably, each weapon listed in Weapon Management interface 450 is either associated with a camera device or unassociated. This enables each listed weapon to be associated with a given camera device at a particular time and then either unassociated or re-associated with a different camera device at a later point in time. This feature and function is enabled by utilizing the dropdown menu 462 listing the Camera ID.

In addition to the ability to associate a weapon with a particular camera device, each listed weapon may also be associated with a particular Assigned User of that weapon. Accordingly, each weapon listed in Weapon Management interface 450 is either associated with an Assigned User or unassociated. This enables each listed weapon to be associated with a given Assigned User at a particular time and then either unassociated or re-associated with a different Assigned User at a later point in time. This feature and function is enabled by utilizing the dropdown menu 464 listing the Assigned User.

When a weapon is taken out of service, the weapon is deleted. This feature and function is enabled via Delete link 466. By actuating the Add Weapon link or button 468, Weapon Management interface 450 also enables a new weapon to be added to the system, and providing an interface for adding a weapon as presented in FIG. 15, where Serial Number, Make and Model are input and saved. Upon being saved, this data is recorded and stored at administration facility 70. By actuating the Edit link or button 470 situated adjacent to Delete link or button 466, Weapon Management interface 450 also enables information for existing weapons to be edited. The edited information may include the Serial Number, Make and Model which is saved after changes are made. Upon being saved, this data is recorded and stored at administration facility 70. For security purposes, the time that a change is made, and the identification of each individual making each change in an association of a weapon to a camera device is captured, logged and recorded for subsequent access and review. By the same token, the same information is tracked when a weapon is deleted and when information pertaining to a weapon is edited. Most preferably access to these functions of adding, editing or deleting a weapon are limited to a small group or single authorized administrative user.

Figure 16:
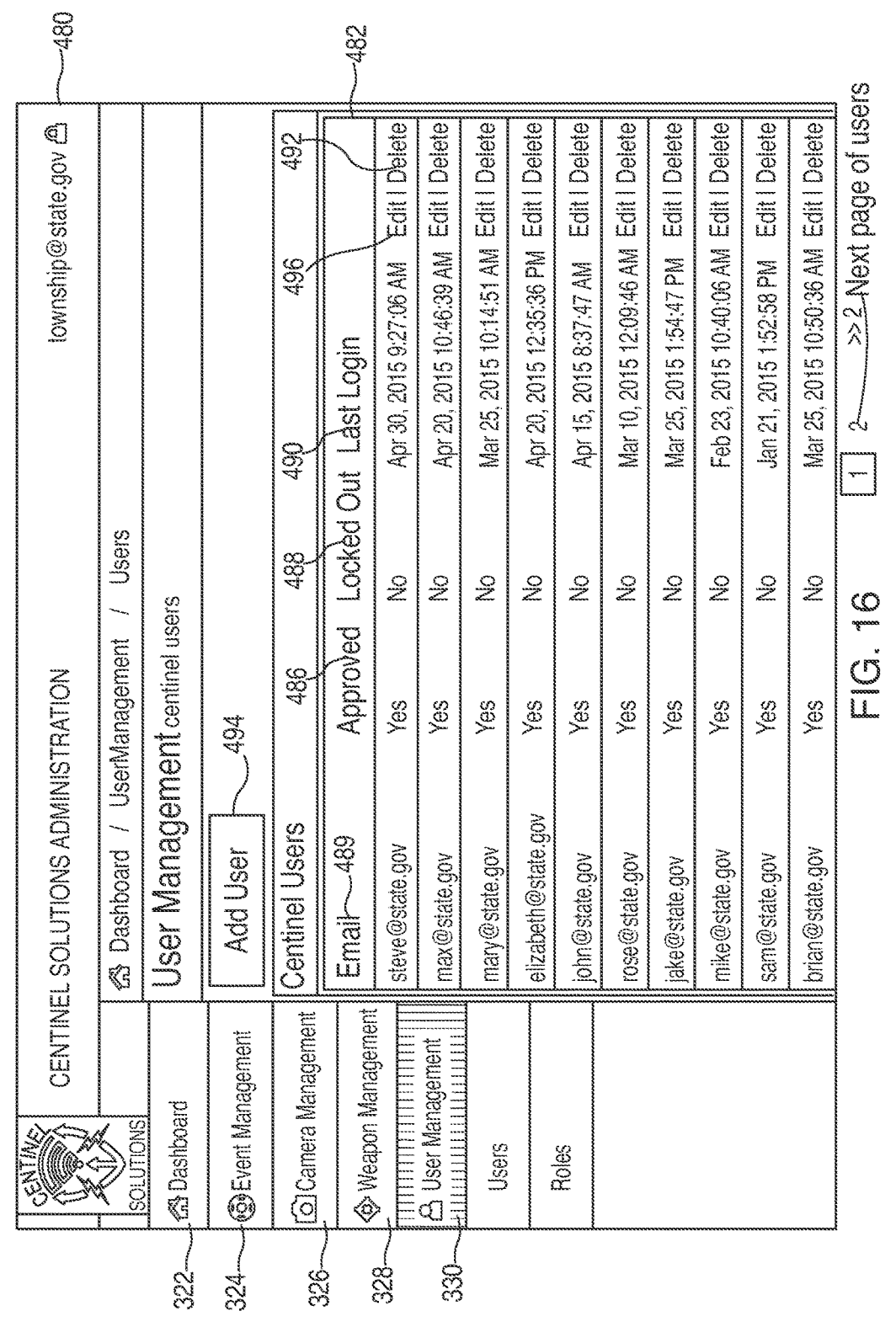
Figure 17:
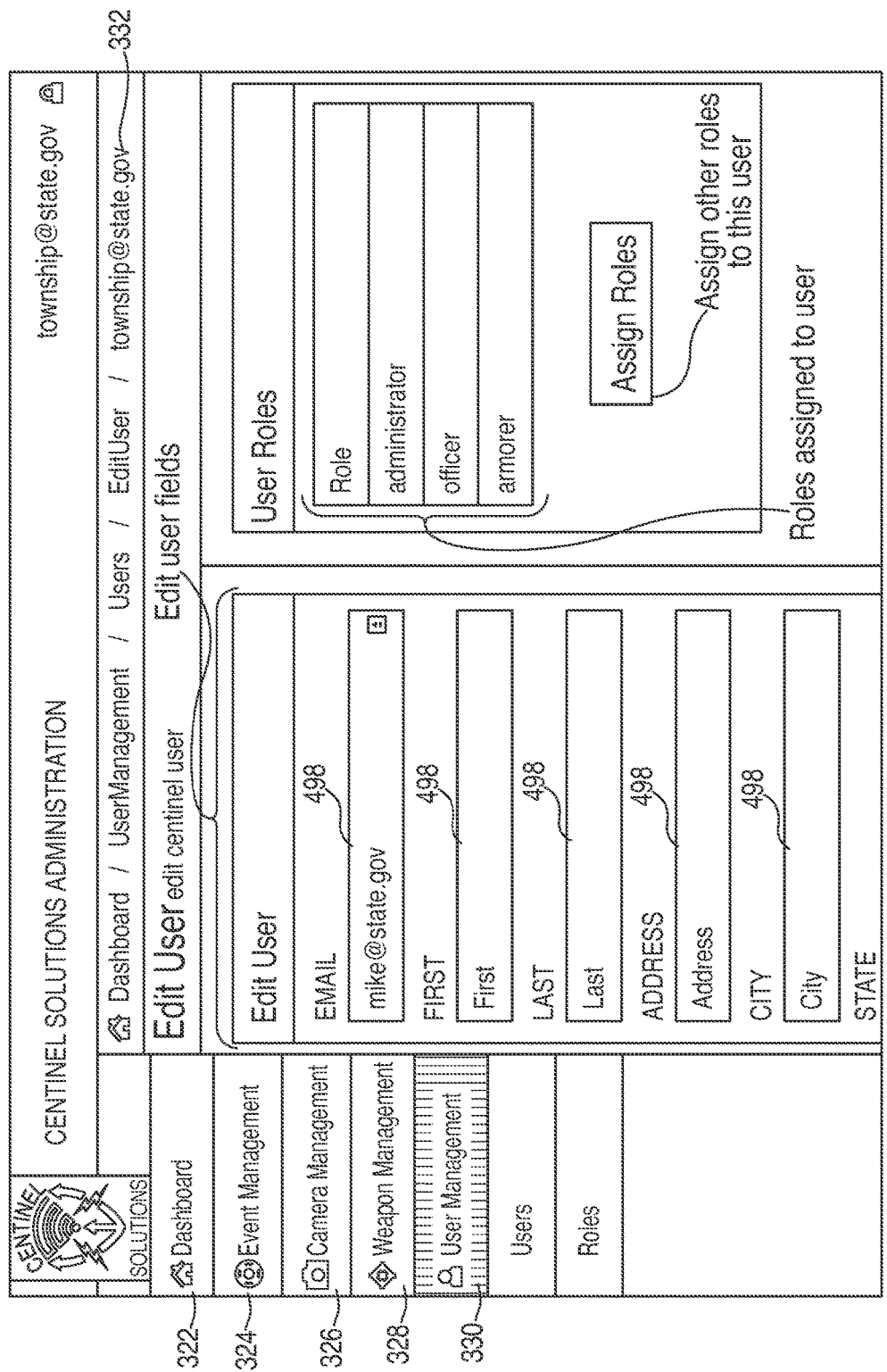
FIG. 17 illustrates an exemplary graphical user interface or display of an edit user function and information display in accordance with an exemplary embodiment of the claimed invention.
Figure 18:
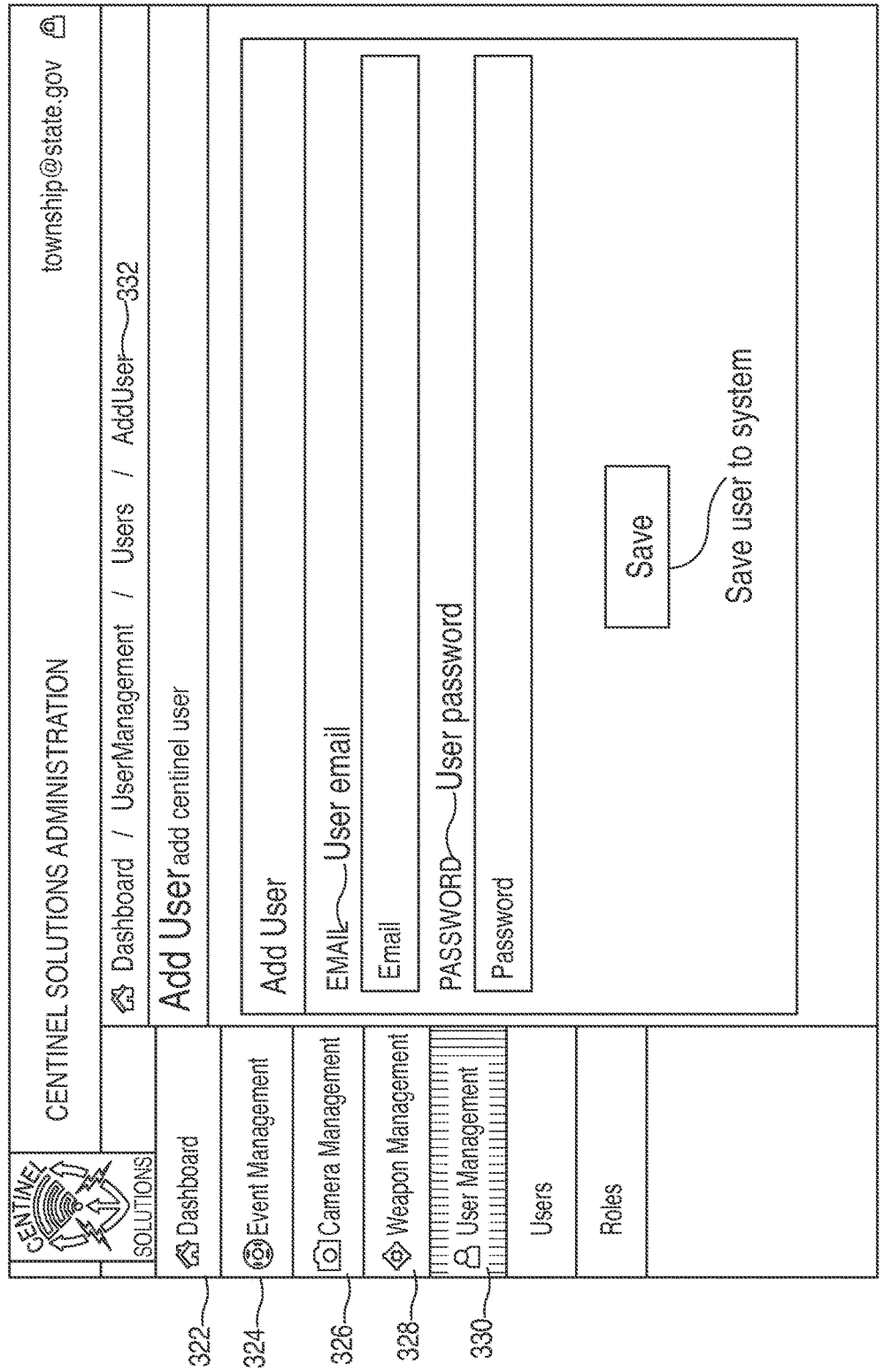
FIG. 18 illustrates an exemplary graphical user interface or display of a user addition function and information display in accordance with an exemplary embodiment of the claimed invention.

Referring to FIG. 16, FIG. 17 and FIG. 18, there is provided an exemplary embodiment of a User Management interface 480 of the present invention. As illustrated on FIG. 16, User Management interface 480 provides a table 482 which lists each user by a unique email address or other User ID 484, whether a user is Approved (i.e., Yes or No) 486, whether a user Locked Out (i.e., Yes or No) 488 and the Last Login 490 of the Use by date and time. In an exemplary embodiment, each user has a unique User ID that is an email address. However, it should be appreciated that other forms of Unique IDs can be utilized.

When a user is removed from the system, the user is deleted. This feature and function is enabled via Delete link 492. By actuating the Add User link or button 494, User Management interface 480 also enables a new user to be added to the system, and providing an interface for adding a user as presented in FIG. 18, where a user's email address and password are input and saved. Upon being saved, this data is recorded and stored at administration facility 70. By actuating the Edit link or button 496 situated adjacent to Delete link or button 492, User Management interface 480 also enables information for existing users to be edited via editing a number of fields 498. As illustrated in FIG. 17, the edited information fields include first name, last name, address and other identifying information. In addition to inputting this information, a User Role (detailed below) is assigned. It should be appreciated that in addition to inputting this information in fields 498 upon editing a user profile, this information may be provided when a user is initially added, as at the Add User interface provided in FIG. 18. Upon being saved, this data associated with a user is recorded and stored at administration facility 70. For security purposes, each time that a change is made, the identification of each individual making each change by adding, editing or deleting a user is captured, logged and recorded for subsequent access and review. Most preferably access to these functions of adding, editing or deleting a user are limited to a small group or single authorized administrative user.

Figure 19:
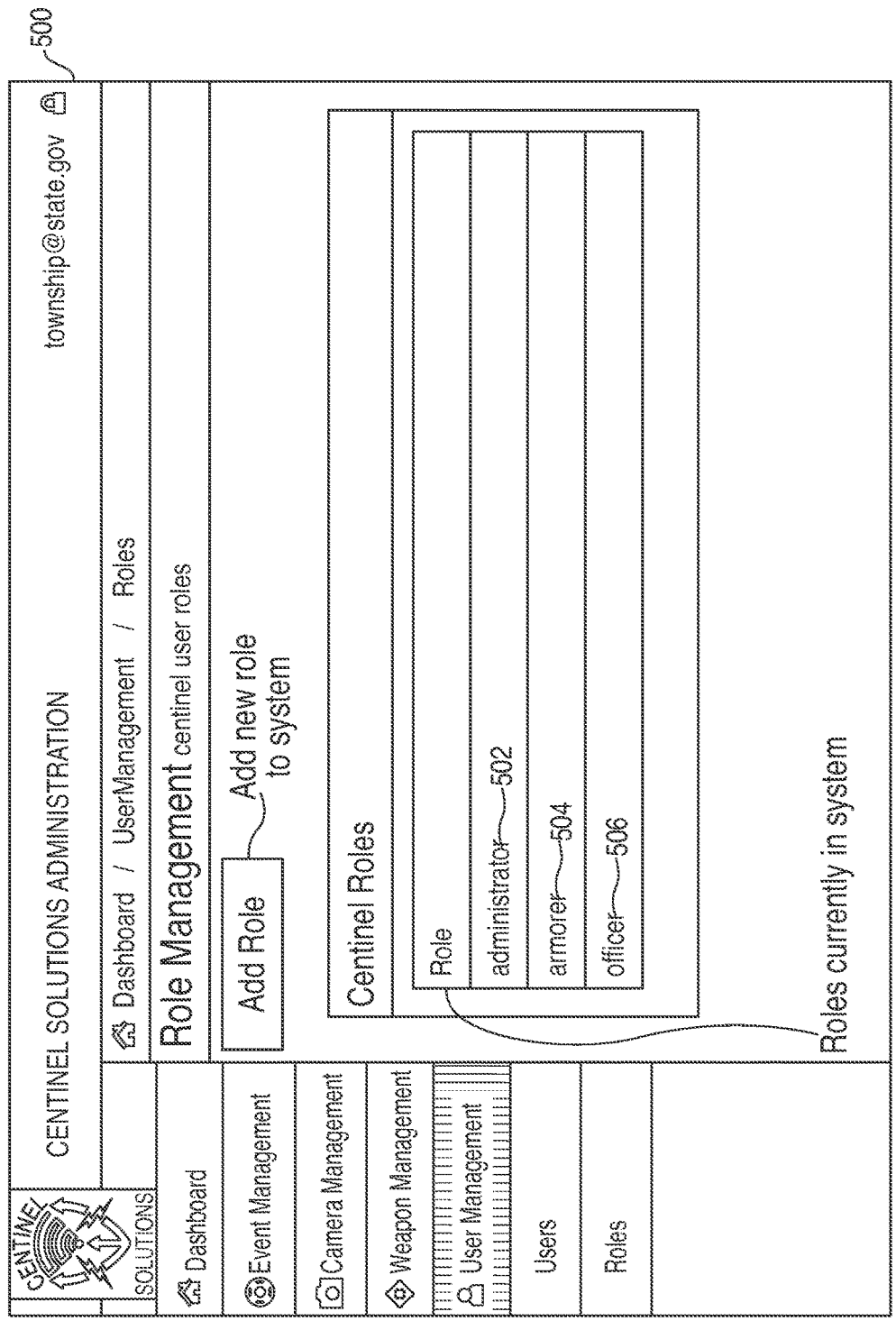
FIG. 19 illustrates an exemplary graphical user interface or display of a user role management function and information display in accordance with an exemplary embodiment of the claimed invention.
Figure 20:
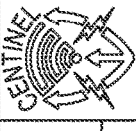
FIG. 20 illustrates an exemplary graphical user interface or display of a user add role management function and information display in accordance with an exemplary embodiment of the claimed invention.
Figure 21:
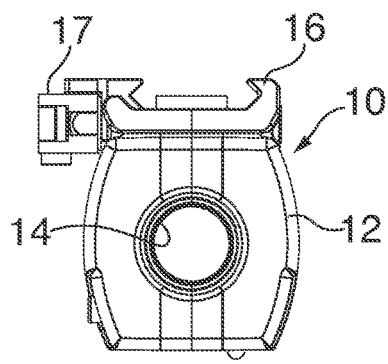
FIG. 21 illustrates a front end view of an electronic camera device in accordance with an exemplary embodiment of the claimed invention.
Figure 22:
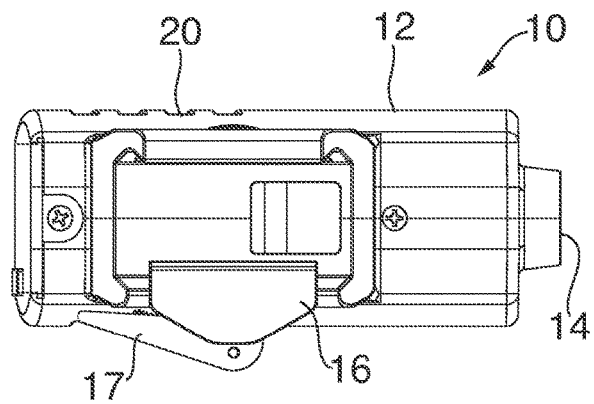
FIG. 22 illustrates a top view of an electronic camera device in accordance with an exemplary embodiment of the claimed invention.
Figure 23:
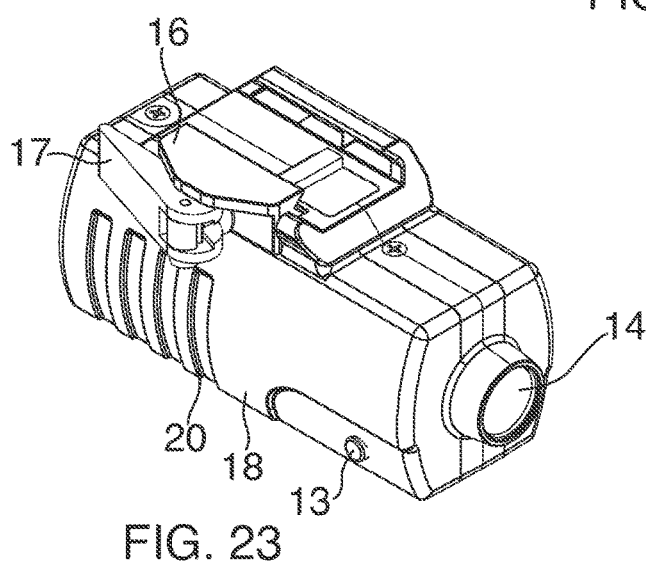
FIG. 23 illustrates a right, front and top perspective view of an electronic camera device in accordance with an exemplary embodiment of the claimed invention.
Figure 24:
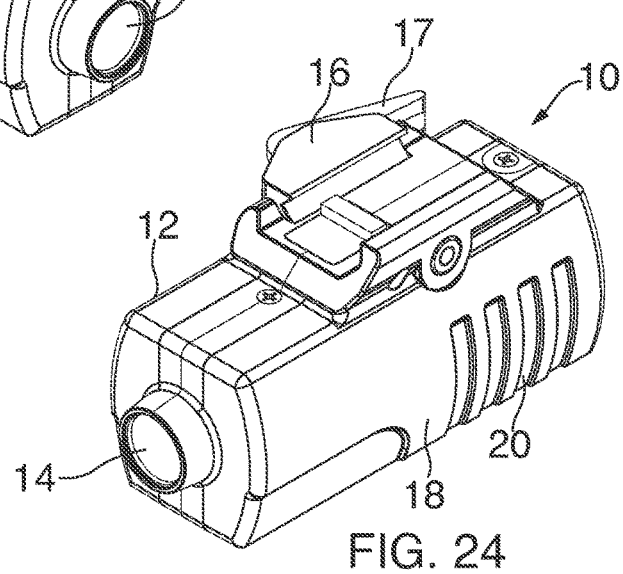
FIG. 24 illustrates a left, front and top perspective view of an electronic camera device in accordance with an exemplary embodiment of the claimed invention.

Referring to FIG. 19 and FIG. 20 there is provided an exemplary embodiment of a User Role Management interface 500. In an exemplary embodiment of the system created in accordance with the present invention, there are a number of user roles, including Administrator 502, Armorer 504 and Officer 506. In addition to the roles specified herein, additional roles can be created as desired, allowing additional users certain rights and privileges in operating the system. The purpose of roles is to provide and enable discrete levels of access to users who are assigned to particular roles. For example, administrators are generally assigned to and provided with unlimited system access to add, edit or delete. On the other hand an individual assigned with to an officer role may be provided with limited access, such as to view only, or restricted access to events in which the individual is associated with. In between, access may be provided to armorers who may be given access to add and/or edit users, weapons and cameras, but not to delete data.

The accompanying drawings only illustrate an exemplary embodiment of a firearm-mounted camera device with networked control and administration system, its constituent parts, and associated methods and processes. However, other exemplary embodiments are possible, and the drawings are not intended to be limiting in that regard. Thus, although the description above and accompanying drawings contains much specificity, the details provided should not be construed as limiting the scope of the embodiment(s) but merely as providing illustrations of some of the presently preferred embodiment(s). The drawings and the description are not to be taken as restrictive on the scope of the embodiment(s) and are understood as broad and general teachings in accordance with the present invention. While the present embodiment(s) of the invention have been described using specific terms, such description is for present illustrative purposes only, and it is to be understood that modifications and variations to such embodiments, including but not limited to the substitutions of equivalent features, materials, or parts, and the reversal of various features thereof, may be practiced by those of ordinary skill in the art without departing from the spirit and scope of the invention.

The invention claimed is:

1. An electronic device for generating and recording video data, audio data, sensor data and other data, comprising:
a housing with a fastening mechanism attached to said housing and adapted to mount said housing to the surface of a firearm, said housing including a first interior side surface and a second interior side surface;

a first board and a second board in operative connection with the first board, wherein the first board is disposed at the first interior side surface and the second board is disposed at the second interior side surface;

a power management unit positioned on the first board;

a processor module positioned on the second board;

a removable panel at a rear of the housing to access the interior of the housing disposed between said first interior side surface and said second interior side surface;

a storage medium memory module in operative connection with said processor module;

an integrated lens and camera module positioned in said housing and configured to generate and record video data in operative connection with said processor module and said storage medium memory module;

a magnetic sensor operatively connected to said processor module that is configured to detect the presence and absence of a magnet and which generates a first signal to said processor module when said magnetic sensor detects the absence of a magnet, said first signal being representative of the absence of a magnet;

an accelerometer sensor operatively connected to said processor module that is configured to detect a draw to firing position motion and which generates a second signal to said processor module when said accelerometer sensor detects said draw to firing position motion, said second signal being representative that a draw to firing position motion has taken place;

wherein when said first signal and said second signal are generated, said camera module is configured to enter an active state and to generate and record video data to said storage medium memory module.

2. The electronic device of claim 1, further comprising a communication module configured to transmit video data that is recorded at storage medium memory module via a communication network to a remote video storage memory unit.

3. The electronic device of claim 1, further comprising a communication module configured to stream said video data that is generated by said camera module and transmit said video data via a communication network to a remote administrative interface.

4. The electronic device of claim 1, further comprising a communication module, wherein said processor module is configured to transmit an emergency notification signal to assets that is representative of said firearm being unholstered via said communication module when said first signal and said second signal are generated.

5. The electronic device of claim 1, further comprising a unique Camera ID identifier, wherein when said video data is recorded to said storage medium memory module, data representative of said Camera ID identifier is inserted with said video data that is recorded.

6. The electronic device of claim 5, further comprising a unique Firearm ID identifier representative of a firearm to which said device is assigned, wherein when said video data is recorded to said storage medium memory module, data representative of said Firearm ID identifier is inserted with said video data that is recorded.

7. The electronic device of claim 1, further comprising a communication module that is configured to receive and transmit data via a cellular network.

8. The electronic device of claim 1, further comprising a communication module that is configured to receive and transmit data via a WiFi network.

9. The electronic device of claim 1, further comprising a communication module that is configured to transmit control signals and initiate record signals to another electronic device.

10. The electronic device of claim 9, wherein said communication module is a Bluetooth antenna configured to establish wireless communication with another electronic device.

11. The electronic device of claim 1, wherein said housing has a maximum length dimension of approximately 92.1 mm, including said lens, maximum width dimension of about 36.4 mm across said lens and maximum height of 36.0 mm.

12. The electronic device of claim 1, further comprising a power supply disposed between the first and second boards.

13. The electronic device of claim 1, wherein said camera module is disposed between the first and second boards.

* * * * *